United States Patent
Orsino

(10) Patent No.: US 12,495,318 B2
(45) Date of Patent: Dec. 9, 2025

(54) RECOVERY OVER SIDELINK

(71) Applicant: Telefonaktiebolaget LM Ericsson (publ), Stockholm (SE)

(72) Inventor: Antonino Orsino, Kirkkonummi (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 526 days.

(21) Appl. No.: 17/637,553

(22) PCT Filed: Aug. 13, 2020

(86) PCT No.: PCT/EP2020/072797
§ 371 (c)(1),
(2) Date: Feb. 23, 2022

(87) PCT Pub. No.: WO2021/037582
PCT Pub. Date: Mar. 4, 2021

(65) Prior Publication Data
US 2022/0286881 A1    Sep. 8, 2022

Related U.S. Application Data

(60) Provisional application No. 62/891,004, filed on Aug. 23, 2019.

(51) Int. Cl.
H04W 24/00    (2009.01)
H04W 24/08    (2009.01)
(Continued)

(52) U.S. Cl.
CPC .......... *H04W 24/08* (2013.01); *H04W 76/15* (2018.02); *H04W 36/00692* (2023.05); *H04W 36/03* (2018.08)

(58) Field of Classification Search
CPC ............. H04W 24/08; H04W 76/15; H04W 36/00692; H04W 36/03; H04W 76/23; H04W 36/305; H04W 76/19; H04W 76/14
See application file for complete search history.

(56) References Cited

U.S. PATENT DOCUMENTS 10,356,832 B2 * 7/2019 Bodas .............. H04W 72/51
2015/0098366 A1 * 4/2015 Wu ................. H04L 5/0035
                                                    370/278
(Continued)

FOREIGN PATENT DOCUMENTS

CN    106256166 A     12/2016
EP    3471493 A1      4/2019
WO    2016164808 A1   10/2016

OTHER PUBLICATIONS

First Office Action for Chinese Patent Application No. 202080074111.0, mailed Oct. 26, 2023, 43 pages.
(Continued)

*Primary Examiner* — Brandon M Renner
(74) *Attorney, Agent, or Firm* — Withrow & Terranova, PLLC

(57) ABSTRACT

Radio Link Failure (RLF) recovery over Sidelink (SL) is provided. Systems and methods are disclosed herein that avoid triggering of a Radio Resource Control (RRC) re-establishment procedure by a User Equipment (UE) upon an RLF, thereby avoiding unnecessary signaling overhead and connectivity interruption. In some embodiments, the UE (UE1) is in communication with another UE (UE2) over an SL, and UE1 detects an RLF over a radio link. Upon detecting the RLF, UE1 sends a failure message to UE2 via an SL channel identifying the detected RLF. Upon receiving the failure message from UE1, UE2 forwards the message to the network via an available Uu link between UE2 and the
(Continued)

network. In some embodiments, before sending the failure message to the network, UE2 performs a random access procedure to a selected cell if no Uu radio link is available and active.

21 Claims, 14 Drawing Sheets

(51) Int. Cl.
*H04W 76/15* (2018.01)
*H04W 36/00* (2009.01)

(56) References Cited

U.S. PATENT DOCUMENTS

| | | | |
|---|---|---|---|
| 2015/0365994 A1 | 12/2015 | Yu et al. | |
| 2016/0338119 A1* | 11/2016 | Bodas | H04W 72/51 |
| 2019/0141771 A1* | 5/2019 | Ma | H04W 76/27 |
| 2019/0229980 A1* | 7/2019 | Han | H04L 41/0668 |
| 2019/0380052 A1* | 12/2019 | Yang | H04W 72/23 |
| 2022/0104299 A1* | 3/2022 | Kim | H04W 76/27 |
| 2022/0110075 A1* | 4/2022 | Zhao | H04W 52/383 |
| 2022/0272554 A1* | 8/2022 | Takahashi | H04W 24/08 |

OTHER PUBLICATIONS

Author Unknown, "Technical Specification Group Services and System Aspects; Study on enhancement of 3GPP Support for 5G V2X Services (Release 16)," Technical Report 22.886, Version 16.2.0, Dec. 2018, 3GPP Organizational Partners, 76 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.6.0, Jun. 2019, 3GPP Organizational Partners, 365 pages.
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.6.0, Jun. 2019, 3GPP Organizational Partners, 960 pages.
Author Unknown, "Technical Specification Group Radio Access Network; NR; Requirements for support of radio resource management (Release 15)," Technical Specification 38.133, Version 15.6.0, Jun. 2019, 3GPP Organizational Partners, 999 pages.
Author Unknown, "Technical Specification Group Radio Access Network; NR; NR and NG-RAN Overall Description; Stage 2 (Release 15)," Technical Specification 38.300, Version 15.6.0, Jun. 2019, 3GPP Organizational Partners, 99 pages.
Author Unknown, "Technical Specification Group Radio Access Network; NR; User Equipment (UE) procedures in Idle mode and RRC Inactive state (Release 15)," Technical Specification 38.304, Version 15.4.0, Jun. 2019, 3GPP Organizational Partners, 29 pages.
Author Unknown, "Technical Specification Group Radio Access Network; NR; Radio Link Control (RLC) protocol specification (Release 15)," Technical Specification 38.322, Version 15.5.0, Mar. 2019, 3GPP Organizational Partners, 33 pages.
Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 519 pages.
International Search Report and Written Opinion for International Patent Application No. PCT/EP2020/072797, mailed Nov. 10, 2020, 12 pages.

* cited by examiner

*LTE and NR interworking options*

*Control plane architecture for dual connectivity in LTE DC and EN-DC*

*Network side protocol termination options for MCG, SCG, and split bearers in MR-DC with EPC (EN-DC)*

Network architecture for control plane in EN-DC

C-ITS environment

Radio link failure due to physical layer problems

*NR SL unicast links between two UEs*

*Link release procedure*

RECOVERY OVER SIDELINK

RELATED APPLICATIONS

This application is a 35 U.S.C. § 371 national phase filing of International Application No. PCT/EP2020/072797, filed Aug. 13, 2020, which claims the benefit of provisional patent application Ser. No. 62/891,004, filed Aug. 23, 2019, the disclosures of which are hereby incorporated herein by reference in their entireties.

TECHNICAL FIELD

The present disclosure relates to recovery from Radio Link Failure (RLF) in wireless communications networks.

BACKGROUND

In Third Generation Partnership Project (3GPP), the Dual Connectivity (DC) solution has been specified, both for Long Term Evolution (LTE) and between LTE and Fifth Generation (5G) New Radio (NR). In DC, two nodes are involved, a Master Node (MN, or Master enhanced or evolved Node B (eNB) (MeNB)) and a Secondary Node (SN, or Secondary eNB (SeNB)). Multi-Connectivity (MC) is the case when there are more than two nodes involved. Also, it has been proposed in 3GPP that DC is used in Ultra Reliable Low Latency Communications (URLLC) cases in order to enhance robustness and to avoid connection interruptions.

3GPP DC

FIG. 1 illustrates different ways to deploy a 5G NR network with or without interworking with LTE radio access (also referred to as Evolved Universal Terrestrial Radio Access (E-UTRA)) and an Evolved Packet Core (EPC). In principle, NR and LTE can be deployed without any interworking, denoted by NR Stand-Alone (SA) operation. That is, the NR base station (gNB) in NR can be connected to a 5G Core Network (CN) (5GCN) and the eNB in LTE can be connected to the EPC with no interconnection between the two (Option 1 and Option 2 in FIG. 1). On the other hand, the first supported version of NR is the so-called Evolved Universal Terrestrial Radio Access Network (E-UTRAN) NR DC (EN-DC), illustrated by Option 3 in FIG. 1. In such a deployment, DC between NR and LTE is applied with LTE as the master and NR as the secondary node. The Radio Access Network (RAN) node (e.g., gNB) supporting NR may not have a control plane connection to the core network (e.g., EPC); instead, it relies on LTE as the MN (MeNB). This is also called "Non-standalone NR." Notice that, in this case, the functionality of an NR cell is limited and would be used for connected mode User Equipments (UEs) as a booster and/or diversity leg, but an RRC_IDLE UE cannot camp on these NR cells.

With introduction of 5GCN, other options may also be valid. As mentioned above, Option 2 supports standalone NR deployment where the gNB is connected to the 5GCN. Similarly, LTE can also be connected to the 5GCN using Option 5 (also known as enhanced LTE (eLTE), E-UTRA/5GCN, or LTE/5GCN and the node can be referred to as a Next Generation eNB (NG-eNB)). In these cases, both NR and LTE are seen as part of the Next Generation RAN (NG-RAN) (and both the NG-eNB and the gNB can be referred to as NG-RAN nodes). It is worth noting that Option 4 and Option 7 are other variants of DC between LTE and NR which will be standardized as part of NG-RAN connected to 5GCN, denoted by Multi-Radio DC (MR-DC). Under the MR-DC umbrella are the following:

EN-DC (Option 3): LTE is the MN and NR is the SN (EPC CN employed),
NR E-UTRA DC (NE-DC) (Option 4): NR is the MN and LTE is the SN (5GCN employed),
NG-RAN E-UTRA NR DC (NGEN-DC) (Option 7): LTE is the MN and NR is the SN (5GCN employed),
NR-DC (variant of Option 2): DC where both the MN and the SN are NR (5GCN employed).

As migration for these options may differ for different operators, it is possible to have deployments with multiple options in parallel in the same network. For example, there could be an eNB supporting Options 3, 5, and 7 in the same network as an NR base station supporting Options 2 and 4. In combination with DC solutions between LTE and NR, it is also possible to support Carrier Aggregation (CA) in each cell group (i.e., Master Cell Group (MCG) and Secondary Cell Group (SCG)) and DC between nodes on the same Radio Access Technology (RAT) (e.g., NR-NR DC). For the LTE cells, a consequence of these different deployments is the coexistence of LTE cells associated to eNBs connected to EPC, 5GCN, or both EPC/5GCN.

As stated earlier, DC is standardized for both LTE and EN-DC. LTE DC and EN-DC are designed differently when it comes to which nodes control what. Basically, there are two options:

1. Centralized solution (like LTE DC),
2. Decentralized solution (like EN-DC).

FIG. 2 shows a schematic control plane architecture 200-1 for DC in LTE DC and a control plane architecture 200-2 for EN-DC. In the control plane architecture 200-1 for LTE DC, a MN 202 has an LTE Radio Resource Control (RRC) entity (LTE RRC) 204 to control a UE 206 (which stores an LTE RRC state 208). The MN 202 communicates with a SN 210-1 over an Xn-C interface. The UE 206 communicates with both the MN 202 and the SN 210-1 over a Uu interface.

The main difference in the control plane architecture 200-2 for EN-DC is that a SN 210-2 has a separate NR RRC entity (NR RRC) 212. This means that the SN 210-2 can also control the UE 206, sometimes without the knowledge of the MN 202 but often the SN 210-2 needs to coordinate with the MN 202. The MN 202 communicates with the SN 210-2 over an Xx-C interface. In the control plane architecture 200-1 for LTE DC, the RRC decisions are always coming from the MN 202 (MN to UE). Note, however, that the SN 210-1 still decides the configuration of the SN 210-1 since it is only the SN 210-1 itself that has knowledge of the resources, capabilities, etc. of the SN 210-1.

For EN-DC, the major changes compared to LTE DC are:
the introduction of a split bearer from the SN 210-2 (known as an SCG split bearer),
the introduction of a split bearer for RRC, and
the introduction of a direct RRC from the SN 210-2 (also referred to as an SCG Signaling Radio Bearer (SRB)).

FIGS. 3 and 4 show User Plane (UP) 300 and Control Plane (CP) 400 architectures for EN-DC. In particular, FIG. 3 illustrates network side protocol termination options for MCG, SCG, and split bearers in MR-DC with EPC (EN-DC). FIG. 4 illustrates a network architecture for CP 400 in EN-DC.

The SN 210 is sometimes referred to as a Secondary gNB (SgNB) (where gNB is an NR base station), and the MN 202 as MeNB in case the LTE is the MN 202 and NR is the SN 210. In the other case where NR is the MN 202 and LTE is the SN 210, the corresponding terms are SeNB and Master gNB (MgNB).

Split RRC messages are mainly used for creating diversity, and the sender can decide to either choose one of the links for scheduling the RRC messages or it can duplicate the message over both links. In the downlink, the path switching between the MCG or SCG legs or duplication on both is left to network implementation. On the other hand, for the uplink, the network configures the UE to use the MCG, SCG, or both legs. The terms "leg," "path," and "Radio Link Control (RLC) bearer" are used interchangeably throughout this document.

CA

When CA is configured, the UE only has one RRC connection with the network. Further, at RRC connection establishment/re-establishment/handover, one serving cell provides the Non Access Stratum (NAS) mobility information, and at RRC connection re-establishment/handover, one serving cell provides the security input. This cell is referred to as the Primary Cell (PCell). In addition, depending on UE capabilities, Secondary Cells (SCells) can be configured to form together with the PCell a set of serving cells. The configured set of serving cells for a UE therefore always consists of one PCell and one or more SCells. Further, when DC is configured, it could be the case that one carrier under the SCG is used as the Primary SCell (PSCell). Hence, in this case there is one PCell and one or more SCell(s) over the MCG and one PSCell and one or more SCell(s) over the SCG.

The reconfiguration, addition, and removal of SCells can be performed by RRC. At intra-RAT handover, RRC can also add, remove, or reconfigure SCells for usage with the target PCell. When adding a new SCell, dedicated RRC signaling is used for sending all required system information of the SCell, i.e. while in connected mode, UEs need not acquire broadcasted system information directly from the SCells.

Vehicle-to-Everything (V2X)

FIG. 5 illustrates a Cellular Intelligent Transport Systems (ITS) (C-ITS) environment. C-ITS aims at defining a new cellular ecosystem for the delivery of vehicular services and their dissemination. Such ecosystem includes both short range and long range V2X service transmissions. In particular, short range communication involves transmissions over a Device-to-Device (D2D) link, also defined as a Sidelink (SL) or PC5 interface in 3GPP, towards other vehicular UEs or Road Side Units (RSUs). On the other hand, for long range transmission, it considers the transmission over the Uu interface between a UE and a base station, in which case packets may be disseminated to different ITS service providers, which could be road traffic authorities, road operators, automotive Original Equipment Manufacturers (OEMs), cellular operators, etc.

When it comes to the SL interface, the first standardization effort in 3GPP dates back to Release (Rel) 12, targeting public safety use cases. Since then, a number of enhancements have been introduced with the objective to enlarge the use cases that could benefit from the D2D technology. Particularly, in LTE Rel-14 and Rel-15, the extensions for the D2D work consists of supporting V2X communication, including any combination of direct communication between vehicles (Vehicle-to-Vehicle (V2V)), pedestrians (Vehicle-to-Pedestrian (V2P)), and infrastructure (Vehicle-to-Infrastructure (V2I)).

While LTE V2X mainly aims at traffic safety services, NR V2X has a much broader scope including not only basic safety services, but also targeting non-safety applications such as extended sensor/data sharing between vehicles, with the objective to strengthen the perception of the surrounding environment of vehicles. Hence, a new set of applications have been captured in 3GPP Technical Report (TR) 22.886 V16.2.0 that would require an enhanced NR system and new NR SL framework. These applications include advanced driving, vehicles platooning, cooperative maneuvers between vehicles, and remote driving.

In this new context, the expected requirements to meet the needed data rate, capacity, reliability, latency, communication range, and speed are made more stringent. What is more, both communication interfaces, PC5 and Uu, could be used to support the advanced V2X use cases, taking into account radio conditions and the environment where the enhanced V2X (eV2X) scenario takes place. For example, given the variety of services that can be transmitted over the SL, a robust Quality of Service (QoS) framework which takes into account the different performance requirements of the different V2X services seems to be needed. Additionally, NR protocols to handle more robust and reliable communication should be designed. All of these issues are currently under the investigation of 3GPP in NR Rel-16.

Radio Link Failure (RLF) Due to Physical Layer Problems

FIG. 6 illustrates RLF due to physical layer problems. It may occur that a UE loses coverage to the cell that the UE is currently connected to. This could occur in a situation when a UE enters a fading dip, or that a handover was needed as described above, but the handover failed for one or another reason. This is particularly true if the "handover region" is very short, as will be further described below.

The quality of the radio link is typically monitored in the UE, e.g. on the physical layer, as described in 3GPP Technical Specification (TS) 38.300 V15.6.0, TS 38.331 V15.6.0 and TS 38.133 V15.6.0, and summarized here in a very short description.

Upon detection that the physical layer experiences problems according to criteria defined in TS 38.133, the physical layer sends an indication to the RRC protocol of the detected problems (out-of-sync indication). After a configurable number (N310) of such consecutive indications, a timer (T310) is started. If the link quality is not improved (recovered) while T310 is running (i.e., there are no N311 consecutive "in-sync" indications from the physical layer), an RLF is declared in the UE, see FIG. 6.

The relevant timers and counters described above are listed here for reference. The UE reads the timer-values from system information broadcasted in the cell. Alternatively, it is possible to configure the UE with UE-specific values of the timers and constants using dedicated signaling, i.e. where specific values are given to specific UEs with messages directed only to each specific UE.

| Timer | Start | Stop | At expiry |
|---|---|---|---|
| T310 | Upon detecting physical layer problems for the SpCell i.e. upon | Upon receiving N311 consecutive in-sync indications from lower layers for the SpCell, | If the T310 is kept in MCG: If AS security is not activated: go to RRC_IDLE else: initiate |

| Timer | Start | Stop | At expiry |
|---|---|---|---|
| | receiving N310 consecutive out-of-sync indications from lower layers. | upon receiving RRCReconfiguration with reconfigurationWithSync for that cell group, and upon initiating the connection re-establishment procedure. Upon SCG release, if the T310 is kept in SCG. | the connection re-establishment procedure. If the T310 is kept in SCG, Inform E-UTRAN/NR about the SCG radio link failure by initiating the SCG failure information procedure as specified in 5.7.3. |
| T311 | Upon initiating the RRC connection re-establishment procedure | Upon selection of a suitable NR cell or a cell using another RAT. | Enter RRC_IDLE |

| Constant | Usage |
|---|---|
| N310 | Maximum number of consecutive "out-of-sync" indications for the SpCell received from lower layers |
| N311 | Maximum number of consecutive "in-sync" indications for the SpCell received from lower layers |

Now, if T310 expires for MCG, and as seen above, the UE initiates a connection re-establishment to recover the ongoing RRC connection. This procedure now includes cell selection by the UE. I.e., the RRC_CONNECTED UE shall now try to autonomously find a better cell to connect to, since the connection to the previous cell failed according to the described measurements (it could occur that the UE returns to the first cell anyway, but the same procedure is also then executed). Once a suitable cell is selected (as further described, e.g., in TS 38.304), the UE requests to re-establish the connection in the selected cell. It is important to note the difference in mobility behaviour as an RLF results in UE based cell selection, in contrast to the normally applied network-controlled mobility.

If the re-establishment is successful (which depends, among other things, if the selected cell and the gNB controlling that cell was prepared to maintain the connection to the UE), then the connection between the UE and the gNB can resume.

A failure of a re-establishment means that the UE goes to RRC_IDLE and the connection is released. To continue communication, a brand new RRC connection has then to be requested and established.

The reason for introducing the timers T31x and counters N31x described above is to add some freedom and hysteresis for configuring the criteria for when a radio link should be considered as failed (and recovered). This is desirable, since it would hurt the end-user performance if a connection is abandoned prematurely if it turned out that the loss of link quality was temporary, and the UE succeeded in recovering the connection without any further actions or procedures (e.g., before T310 expires, or before the counting reaches value N310).

The procedures for NR RLF detection related actions are shown below (text reproduced from 3GPP TS 38.331 V15.6.0):

5.3.10 Radio link failure related actions
5.3.10.1    Detection of physical layer problems in RRC_CONNECTED
The UE shall:
  1>  upon receiving N310 consecutive "out-of-sync" indications for the SpCell from lower
     layers while neither T300, T301, T304, T319 not T311 is running:
    2>  start timer T310 for the corresponding SpCell.
5.3.10.2    Recovery of physical layer problems
Upon receiving N311 consecutive "in-sync" indications for the SpCell from lower layers while
T310 is running, the UE shall:
  1>  stop timer T310 for the corresponding SpCell.
  NOTE 1:    In this case, the UE maintains the RRC connection without explicit signalling, i.e.
         the UE maintains the entire radio resource configuration.
  NOTE 2:    Periods in time where neither "in-sync" nor "out-of-sync" is reported by layer 1 do
         not affect the evaluation of the number of consecutive "in-sync" or "out-of-sync"
         indications.
5.3.10.3    Detection of radio link failure
The UE shall:
  1>  upon T310 expiry in PCell; or
  1>  upon random access problem indication from MCG MAC while neither T300, T301, T304
     nor T311 is running; or
  1>  upon indication from MCG RLC that the maximum number of retransmissions has been
     reached:
    2>  if CA duplication is configured and activated; and for the corresponding logical
       channel allowedServingCells only includes SCell(s):
      3>  initiate the failure information procedure as specified in 5.7.x to report RLC
         failure.
    2>  else:
      3>  consider radio link failure to be detected for the MCG i.e. RLF;
      3>  if AS security has not been activated:
        4>  perform the actions upon going to RRC_IDLE as specified in 5.3.11, with release

```
                cause 'other';
        3>  else:
                4>  initiate the connection re-establishment procedure as specified in 5.3.7.
The UE shall:
1>  upon T310 expiry in PSCell; or
1>  upon random access problem indication from SCG MAC; or
1>  upon indication from SCG RLC that the maximum number of retransmissions has been
    reached:
        2>  if CA duplication is configured and activated; and for the corresponding logical
            channel allowedServingCells only includes SCell(s):
                3>  initiate the failure information procedure as specified in 5.7.x to report RLC
                    failure.
        2>  else:
        3>  consider radio link failure to be detected for the SCG i.e. SCG-RLF;
        2>  initiate the SCG failure information procedure as specified in 5.7.3 to report SCG
            radio link failure.
```

NR SL Unicast Link

FIG. 7 illustrates NR SL unicast links between a pair of UEs. For NR SL, unicast at access stratum is supported for services requiring high reliability. Between the same UE pair, there can be multiple SL unicast links and each link can support multiple SL QoS flows/radio bearers. At access stratum each link can be identified by the source and destination L2 Identity (ID). For instance, the PC5 unicast link 1 in FIG. 7 can be identified by the pair of L2 ID1 (i.e., corresponding to application ID1) and L2 ID2 (i.e., corresponding to application ID2).

More specifically, at physical layer, Hybrid Automatic Repeat Request (HARQ) Acknowledgement/Negative Acknowledgement (ACK/NACK) feedback can be configured such that the receiver UE in a SL unicast pair will send ACK when the Transport Block (TB) is received successfully or send NACK when the TB reception fails. Besides RLC Unacknowledged Mode (UM), RLC Acknowledged Mode (AM) can also be configured for NR SL unicast transmission/reception. When RLC AM is configured, depending on RLC Protocol Data Unit (PDU) reception failure, the receiving (RX) UE will send an RLC status report to the transmitting (TX) UE and request retransmitting the missing RLC PDUs.

A similar RLF procedure as in NR Uu is also supported for NR SL unicast with following possible criteria:

Expiry of a timer started after indication of radio problems (e.g., Out of Sync) from the physical layer; or Maximum number of RLC retransmissions is reached; or Maximum number of consecutive HARQ NACK feedbacks is reached; or Channel Busy Ratio (CBR) is higher than a threshold value.

FIG. 8 illustrates a link release procedure for the NR SL unicast links of FIG. 7. At the end, one UE may release an established unicast link due to bad link quality or due to stopped service. The illustrated link release procedure is based on PC5-S signaling.

SL Resource Allocation

There are two different Resource Allocation (RA) procedures for V2X on SL, i.e. network controlled RA (so called "mode 3" in LTE and "mode 1" in NR) and autonomous RA (so called "mode 4" in LTE and "mode 2" in NR). The transmission resources are selected within a resource pool which is predefined or configured by the network.

With network controlled RA, NG-RAN is in charge of scheduling SL resource(s) to be used by the UE for SL transmission(s). The UE sends SL Buffer Status Report (BSR) to the network to inform about SL data available for transmission in the SL buffers associated with the Medium Access Control (MAC) entity. The network then signals the RA to the UE using Downlink Control Information (DCI). Network controlled (or mode 1) RA may be realized via dynamic scheduling signalling via Physical Downlink Control Channel (PDCCH), or by semi-persistent scheduling in which the gNB provides one or more configured SL grants. Both type-1 and type-2 configured SL grants are supported.

With autonomous RA, each device independently decides which SL radio resources to use for SL operations, based on, e.g., reading received SL Control Information (SCI) or energy detection. For both RA modes, an SCI is transmitted on Physical Sidelink Control Channel (PSCCH) to indicate the assigned SL resources for Physical Sidelink Shared Channel (PSSCH). Unlike network controlled RA, which can only be performed when the UE is in RRC_CONNECTED state, autonomous RA (or mode 2) can be performed both when the UE is in RRC_CONNECTED mode and when the UE is in INACTIVE/IDLE state, and also when the UE is under Uu coverage and out-of-coverage. In particular, when the UE is in RRC_CONNECTED mode, the SL resource pool can be configured with dedicated RRC signalling, while for IDLE/INACTIVE mode operations, the UE shall rely on the SL resource pool provisioned in broadcasting signal, i.e. System Information Block (SIB).

There currently exist certain challenge(s). In Non-SA (NSA) or SA NR deployment scenarios, SL operations and transmissions among UEs may be network controlled (i.e., SL mode 1 transmissions) or not (i.e., SL mode 2 transmissions). In case of SL mode 2 transmissions, even if the SL UEs operate autonomously without help on the network, they may be still under a network coverage (i.e., under the coverage of the primary node, secondary node, or both).

When an RLF is experienced in NR, different actions are performed based on if DC or CA is activated and based on whether the RLF has been detected on the MCG, SCG, PCell/PSCell, or SCell. In particular:

If DC duplication is activated:

If the RLF happens on the SCG, the UE sends the SCGFailureInformation message to the MCG and no RRC re-establishment is triggered.

If the RLF happens on the MCG, according to 3GPP Rel-15 the UE triggers RRC re-establishment.

If the RLF happens on the MCG, according to 3GPP Rel-16 the UE sends the MCGFailureInformation message to the network and no RRC re-establishment is triggered.

If CA duplication is activated:
  If the RLF happens to an RLC entity mapped to a PCell (i.e., on the MCG side), RRC re-establishment procedure is triggered. This case may also happen in case of NR standalone.
  If the RLF happens to an RLC entity mapped to a PSCell (i.e., on the SCG side), the SCGFailureInformation procedure is used and the RLF is reported to the MCG and no RRC re-establishment is triggered.
  If the RLF happens to an RLC entity mapped to an SCell (i.e., regardless if is on the MCG or SCG side), the UE sends a report to the network (i.e., FailureInformation message) and no RRC re-establishment is triggered.

According to the described case, if prior art is applied, as a general rule the RRC re-establishment procedure is applied when the RLF is detected on the PCell. Further, in another case, the RRC re-establishment is also triggered when the UE does not have an available link to the network over which the RLF RRC message (e.g., MCGFailureInformation, SCGFailureInformation, or FailureInformation message) can be sent.

If RRC re-establishment is executed, this will lead to a connectivity interruption and high latencies due to the high time-consuming nature of this RRC procedure.

SUMMARY

Radio Link Failure (RLF) recovery over Sidelink (SL) is provided. In some embodiments, a method is performed by a first wireless device for detecting and handling a radio link failure in a cellular communications system, the method comprising: detecting a radio link failure of a first radio link between the first wireless device and a radio access network of the cellular communications system; and sending a failure message to a second wireless device via a sidelink between the first wireless device and the second wireless device.

In some embodiments, the method further comprises receiving a response from the second wireless device via the sidelink. In some embodiments, the method further comprises receiving a response from a radio access node in the radio access network via a second radio link between the first wireless device and the radio access node. In some embodiments, the response is a Radio Resource Control (RRC) message that triggers a particular RRC procedure. In some embodiments, the method further comprises performing one or more actions in accordance with the response.

In some embodiments, the failure message is a FailureInformation message. In some embodiments, the failure message is a MCGFailureInformation message or a SCGFailureInformation message. In some embodiments, the failure message comprises a wireless device context of the first wireless device. In some embodiments, the failure message comprises information that is relevant to the radio link failure.

In some embodiments, the failure message is a RRC message for handling radio link failure in Carrier Aggregation (CA) Dual Connectivity (DC) or standalone operation with help of the sidelink.

In some embodiments, the failure message comprises an indication of a failure case that directly or indirectly indicates one or more conditions that caused the radio link failure.

In some embodiments, the failure message comprises one or more latest measurements related to the first radio link made by the first wireless device.

In some embodiments, a method is performed by a second wireless device for handling a radio link failure at a first wireless device in a cellular communications system, the method comprising: receiving a failure message from the first wireless device via a sidelink between the first wireless device and the second wireless device, the failure message being related to a radio link failure at the first wireless device of a first radio link between the first wireless device and a radio access network of the cellular communications system; and sending the failure message to a radio access node in the radio access network of the cellular communications system via a second radio link between the second wireless device and the radio access node.

In some embodiments, the method further comprises performing a radio access procedure to establish the second radio link between the second wireless device and the radio access node. In some embodiments, the radio access procedure is a random access procedure.

In some embodiments, the method further comprises: receiving a response from the radio access node; and sending the response to the first wireless device via the sidelink. In some embodiments, the method further comprises: receiving a response from a second radio access node; and sending the response to the first wireless device via the sidelink. In some embodiments, the response is a RRC message that triggers a particular RRC procedure.

In some embodiments, the failure message is a FailureInformation message. In some embodiments, the failure message is a MCGFailureInformation message or a SCGFailureInformation message. In some embodiments, the failure message comprises a wireless device context of the first wireless device. In some embodiments, the failure message comprises information that is relevant to the radio link failure.

In some embodiments, the failure message is a RRC message for handling radio link failure in CA DC or standalone operation with help of the sidelink.

In some embodiments, the failure message comprises an indication of a failure case that directly or indirectly indicates one or more conditions that caused the radio link failure.

In some embodiments, the failure message comprises one or more latest measurements related to the first radio link made by the first wireless device.

In some embodiments, a UE comprising a processor is configured to perform the method of any of the above embodiments.

In some embodiments, a method is performed by a first base station handling radio link failure, the method comprising: receiving a failure message from a second wireless device, the failure message being related to a radio link failure at a first wireless device of a first radio link between the first wireless device and a radio access network of a cellular communications system; and either: sending a response to the second wireless device; or sending a response to the first wireless device; or sending, to a second base station, the failure message, a response to the failure message, an indication that triggers a particular procedure, or a request for a particular procedure.

In some embodiments, the method further comprises performing a radio access procedure to establish a second radio link between the second wireless device and the first base station. In some embodiments, the radio access procedure is a random access procedure.

In some embodiments, the response is a RRC message that triggers a particular RRC procedure.

In some embodiments, the failure message is a Failure-Information message.

In some embodiments, the failure message is a MCGFailureInformation message or a SCGFailureInformation message. In some embodiments, the failure message comprises a wireless device context of the first wireless device. In some embodiments, the failure message comprises information that is relevant to the radio link failure.

In some embodiments, the failure message is a RRC message for handling radio link failure in CA DC or standalone operation with help of a sidelink.

In some embodiments, the failure message comprises an indication of a failure case that directly or indirectly indicates one or more conditions that caused the radio link failure.

In some embodiments, the failure message comprises one or more latest measurements made by the first wireless device.

In some embodiments, a radio access node comprises a processor configured to perform the method of any of the above embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
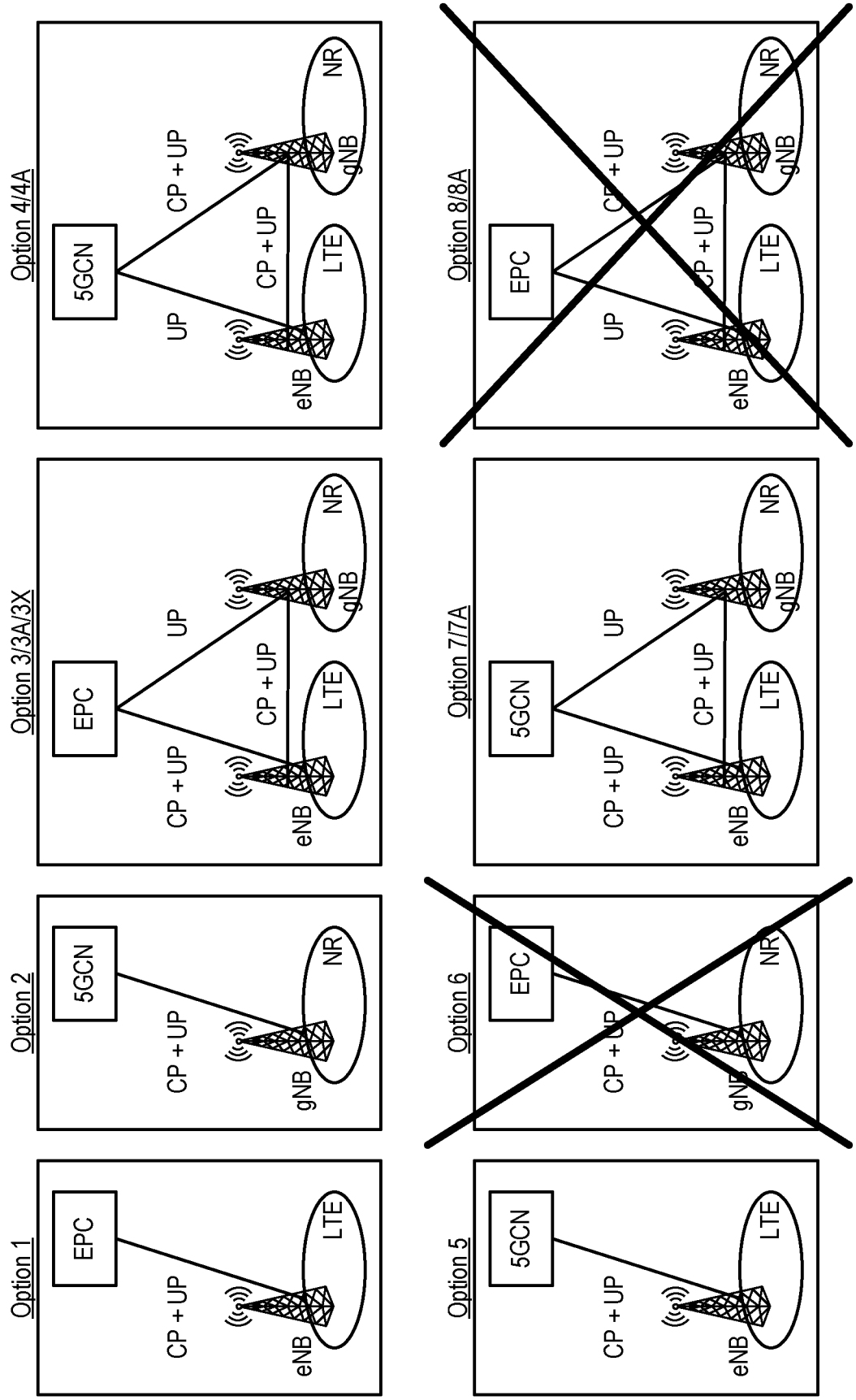
FIG. 1 illustrates different ways to deploy a Fifth Generation (5G) New Radio (NR) network with or without interworking with Long Term Evolution (LTE) radio access (also referred to as Evolved Universal Terrestrial Radio Access (E-UTRA)) and an Evolved Packet Core (EPC).
Figure 2:
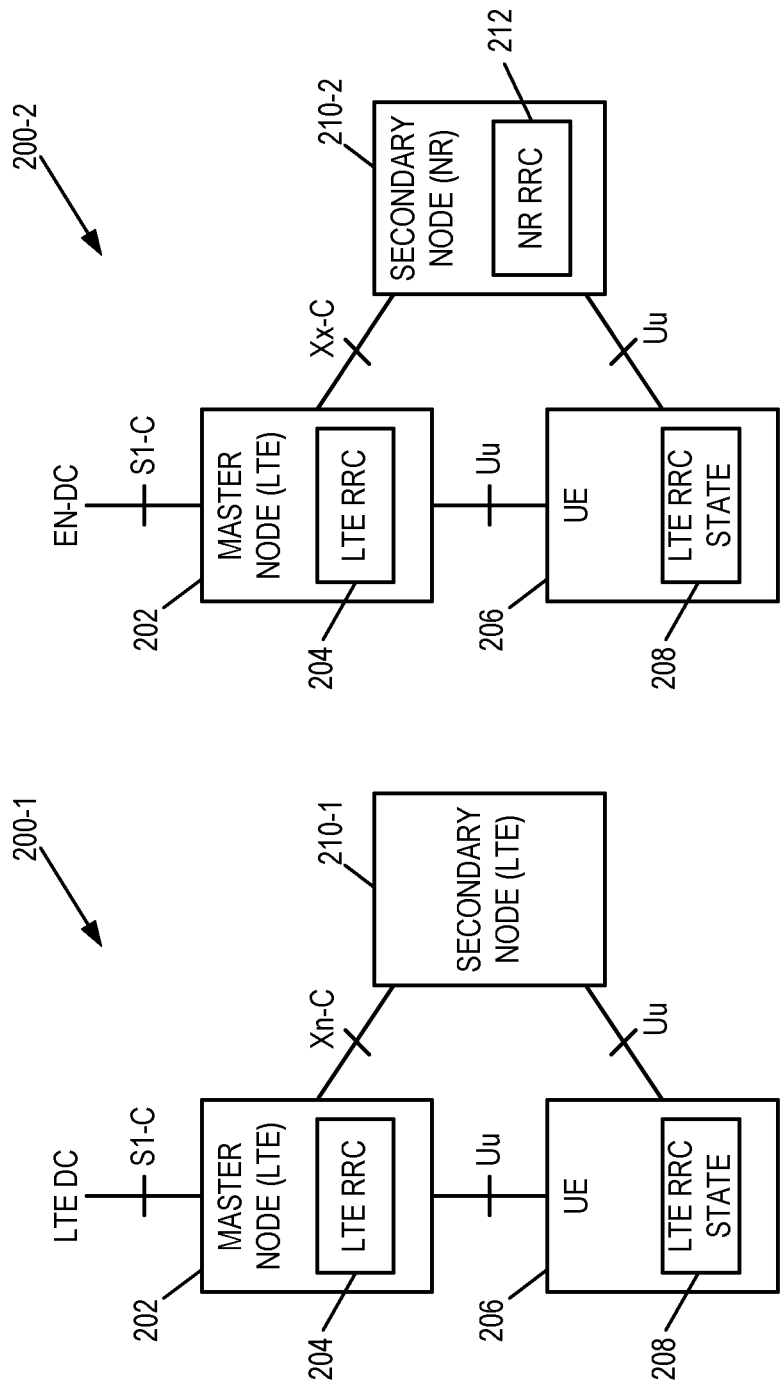
FIG. 2 shows a schematic control plane architecture for Dual Connectivity (DC) in LTE DC and a control plane architecture for Evolved Universal Terrestrial Radio Access Network (E-UTRAN) NR DC (EN-DC).
Figure 3:
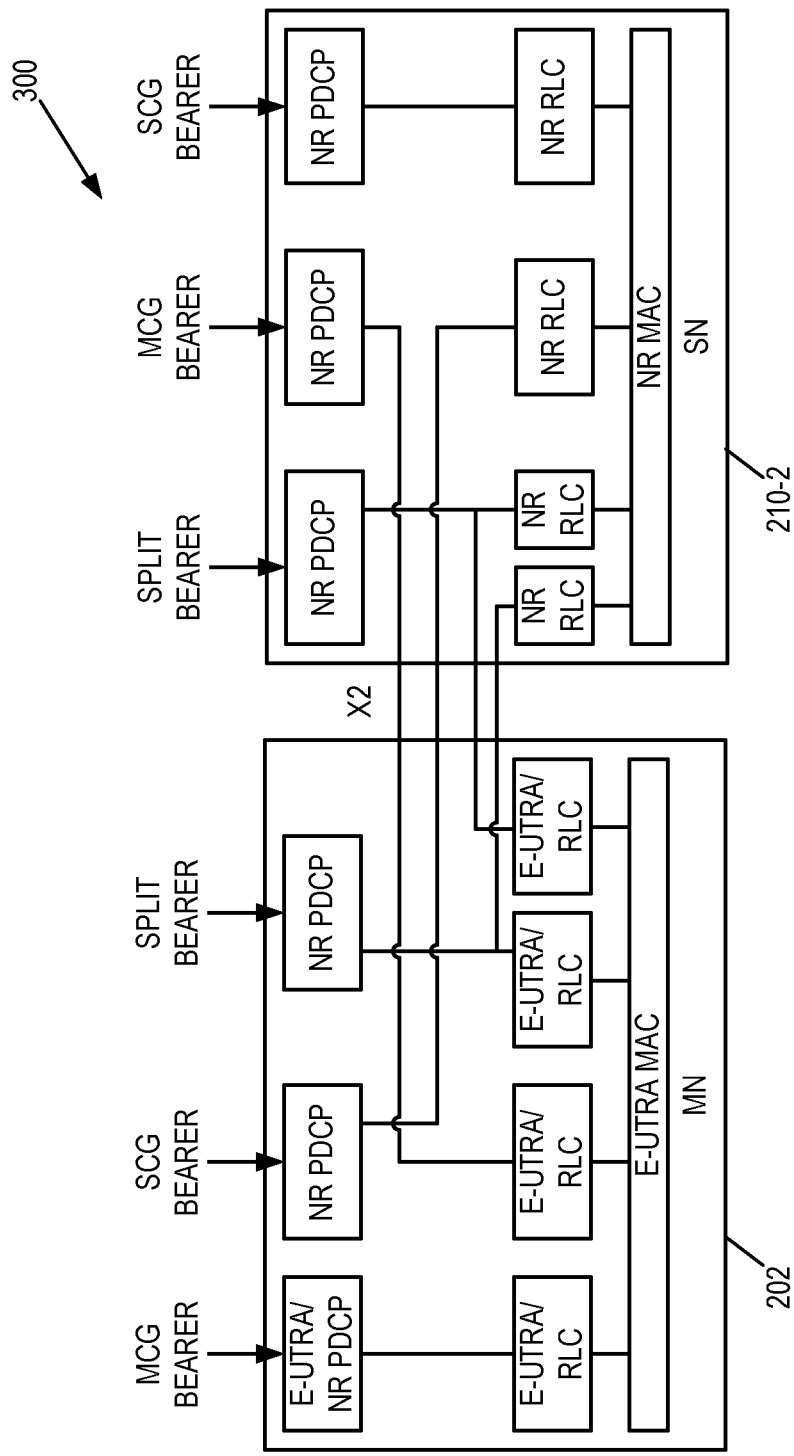
FIG. 3 illustrates network side protocol termination options for Master Cell Group (MCG), Secondary Cell Group (SCG), and split bearers in Multi-Radio DC (MR-DC) with EPC (EN-DC).
Figure 4:
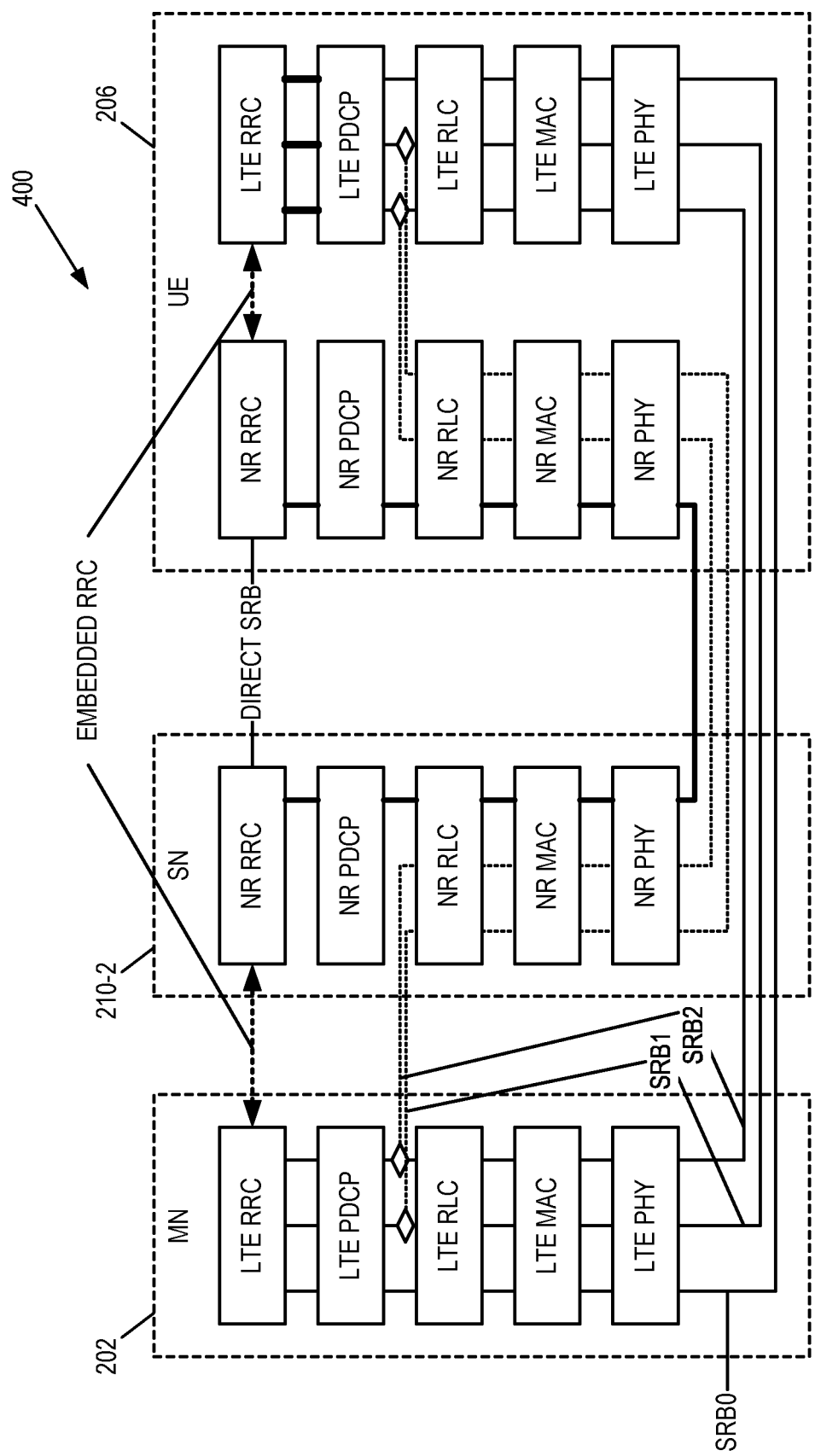
FIG. 4 illustrates a network architecture for Control Plane (CP) in EN-DC.
Figure 5:
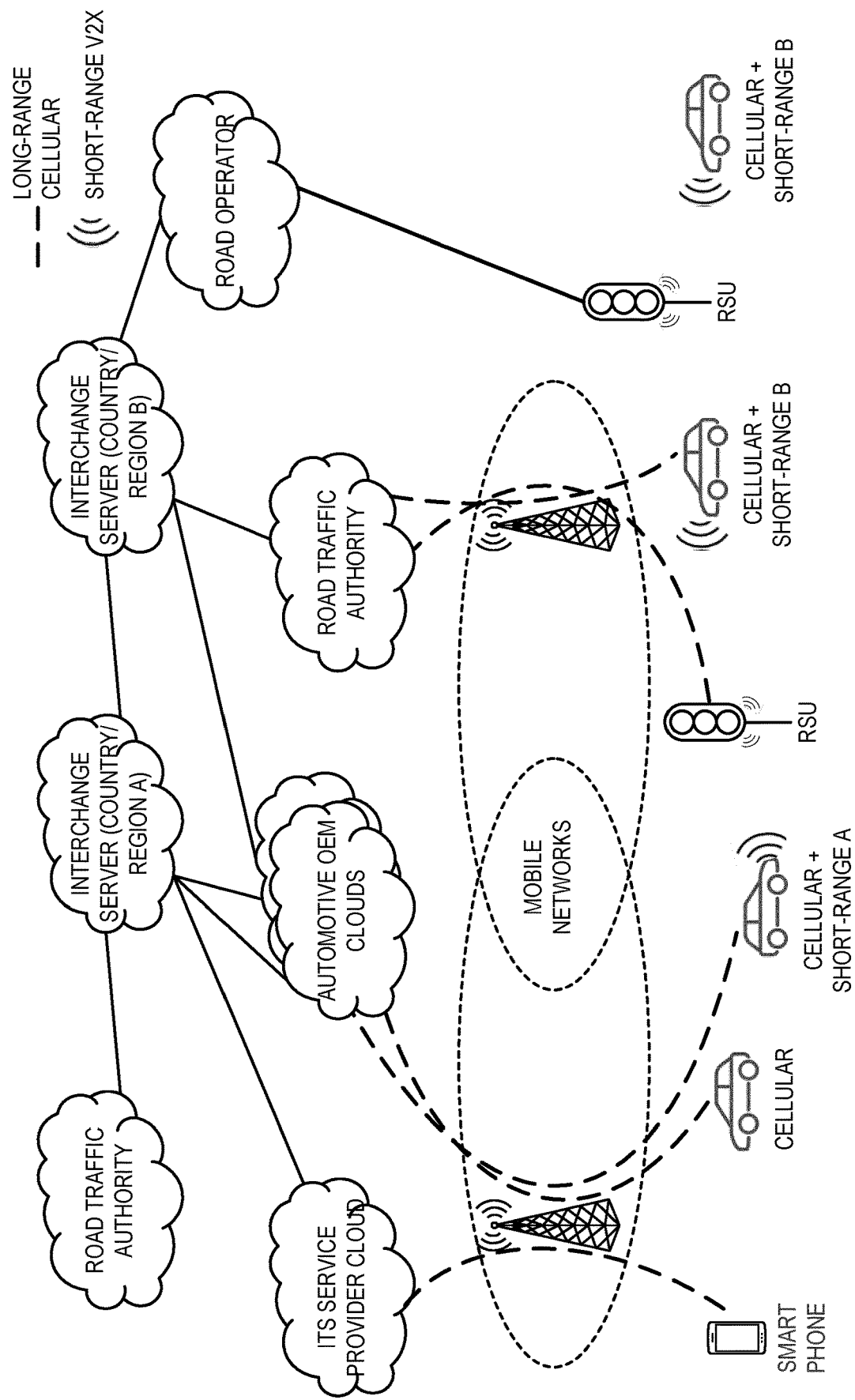
FIG. 5 illustrates a Cellular Intelligent Transport Systems (ITS) (C-ITS) environment.
Figure 6:
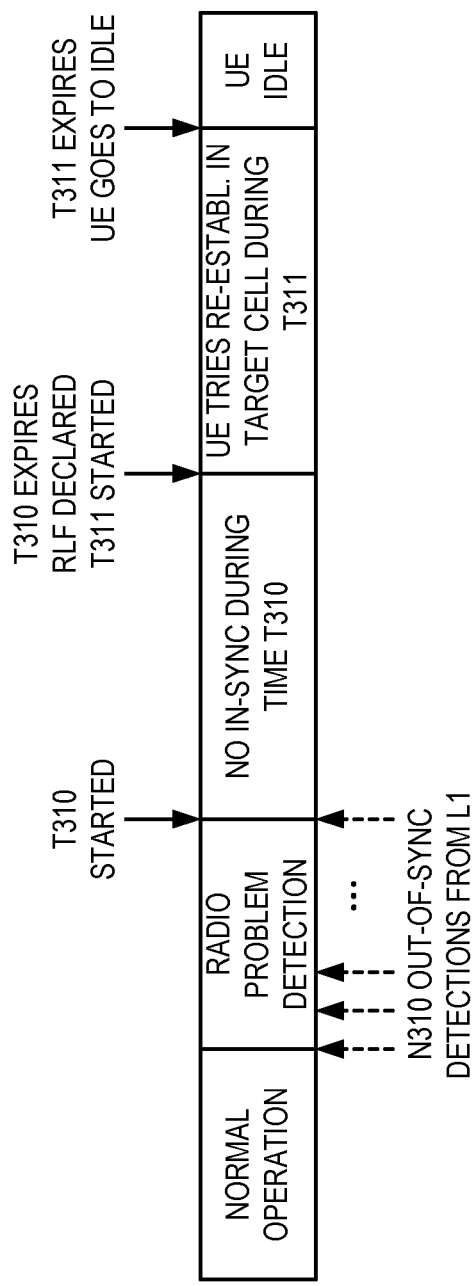
FIG. 6 illustrates Radio Link Failure (RLF) due to physical layer problems.
Figure 7:
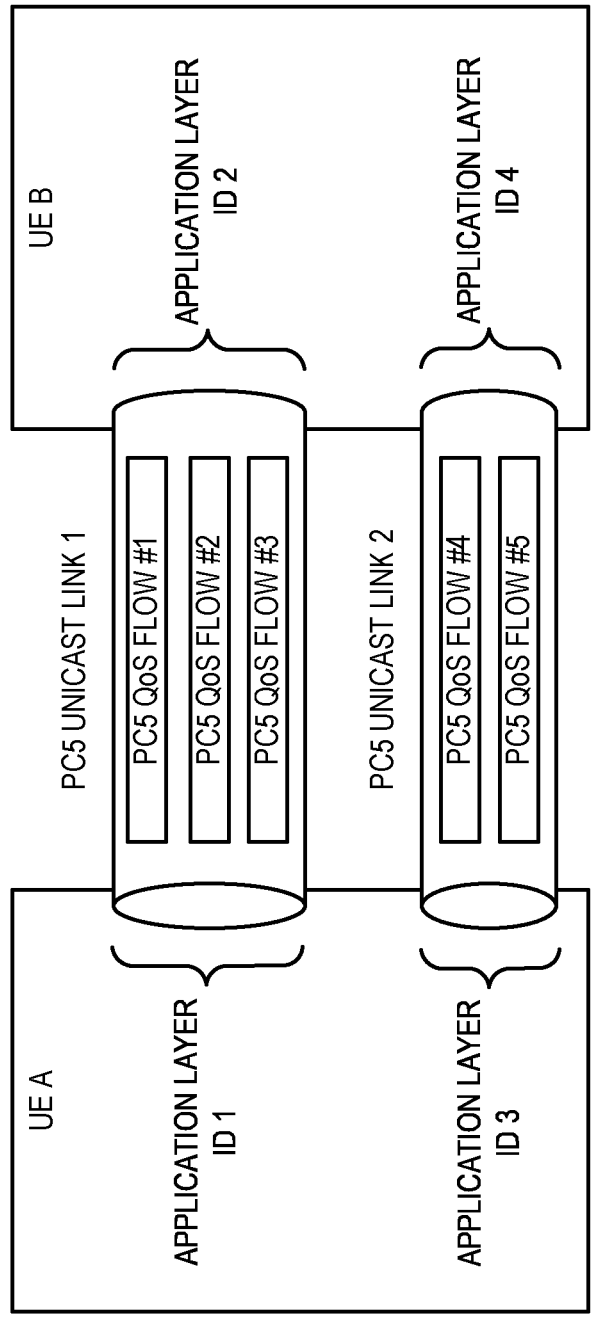
FIG. 7 illustrates NR Sidelink (SL) unicast links between a pair of User Equipment (UEs).
Figure 8:
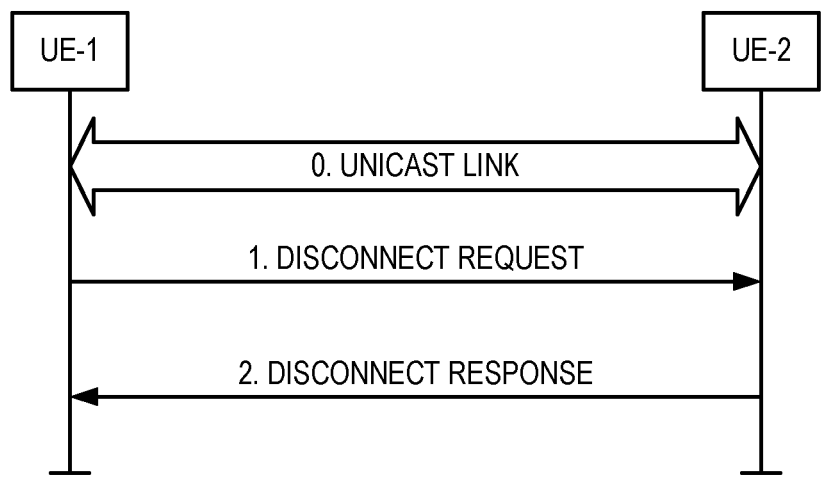
FIG. 8 illustrates a link release procedure for the NR SL unicast links of FIG. 7.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN) or any node that implements a CN function. Some examples of a CN node include, e.g., a Mobility Management Entity (MME), a Packet Data Network Gateway (P-GW), a Service Capability Exposure Function (SCEF), a Home Subscriber Server (HSS), or the like. Some other examples of a CN node include a node implementing a Access and Mobility Function (AMF), a User Plane (UP) Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Sidelink Wireless Device: As used herein, a "sidelink wireless device," "sidelink capable wireless device," "sidelink UE," or "sidelink capable UE" is a wireless device or UE capable of Sidelink (SL) communication.

Network Node: As used herein, a "network node" is any node that is either part of the RAN or the CN of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Radio Link Failure (RLF) recovery over SL is provided. Systems and methods are disclosed herein that avoid triggering of a Radio Resource Control (RRC) re-establishment procedure by a UE upon an RLF, thereby avoiding unnecessary signaling overhead and connectivity interruption. In some embodiments, the UE (UE1) is in communication with another UE (UE2) over an SL, and UE1 detects an RLF over a radio link (e.g., a Uu radio link with a base station). Upon detecting the RLF, UE1 sends a failure message to UE2 via an SL channel identifying the detected RLF. In some embodiments, the failure message includes additional information, such as the UE1 context and UE1 relevant information (e.g., the measurement that UE1 has performed, the failure type, UE identity, and/or serving frequencies), or other information that helps the network to understand what condition has caused the failure. Upon receiving the failure message from UE1, UE2 forwards the message to the network via an available Uu link between UE2 and the network (e.g., an associated base station). In some embodiments, before sending the failure message to the network, UE2 performs a random access procedure to a selected cell if no Uu radio link is available and active (i.e., UE2 is operating in SL mode 2).

In some embodiments, RLF recovery is provided over SL in Carrier Aggregation (CA). Upon detecting an RLF on a Primary Cell (PCell), if the UE (UE1) is involved in SL operations with another UE (UE2), then UE1 sends a FailureInformation message to UE2, and UE2 forwards the FailureInformation message to the network if a Uu link between the UE2 and the network exists. If a Uu link between the UE2 and the network does not exist, then UE2 performs random access over the network before sending the FailureInformation message (i.e., if the random access procedure succeeds).

In some other embodiments, RLF recovery is provided over SL where Dual Connectivity (DC) duplication is activated. When the UE detects an RLF on a Master Cell Group (MCG) (or Secondary Cell Group (SCG)) and no available Uu link is available towards the network (i.e., Uu links over the MCG and the SCG are failed), if the UE (UE1) is involved in SL operations with another UE (UE2), then UE1 sends a MCGFailureInformation (i.e., for RLF detected on the MCG) or SCGFailureInformation (i.e., for RLF detected on the SCG) message to UE2, and UE2 forwards the message to the network (i.e., to the MCG or SCG) if a Uu link between UE2 and the network exists. If a Uu link between UE2 and the network does not exist, then UE2 performs random access over the network (i.e., on the MCG or SCG) before sending the FailureInformation message (i.e., if the random access procedure succeeds).

Certain embodiments may provide one or more of the following technical advantage(s). For example, systems and methods disclosed herein avoid triggering of an RRC re-establishment procedure by a UE upon detecting an RLF, in case of DC and CA duplication. As a result, unnecessary signaling overhead and connectivity interruption due to the RRC re-establishment procedure are avoided.

As another example, embodiments of the present disclosure avoid the RRC re-establishment procedure by allowing the sending of a failure report via an SL UE (if SL operations are ongoing) to the network, when RLF is detected on the PCell or when no Uu link to the network is available for the UE who detected the RLF. In this way, the UE is not forced to trigger the RRC re-establishment procedure and, once being informed about the RLF, the network can decide to take actions in order to avoid a connectivity interruption.

Figure 9:
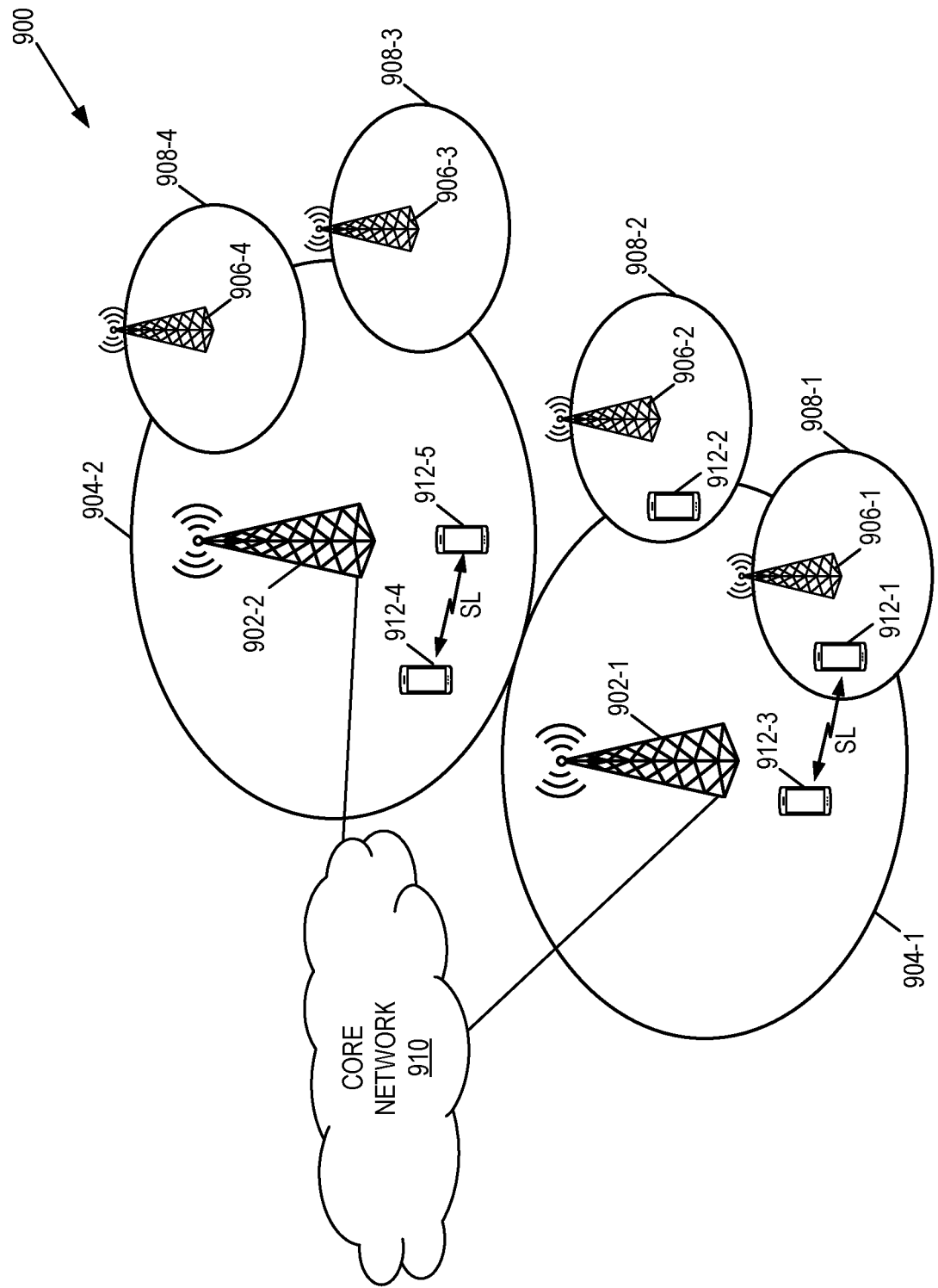
FIG. 9 illustrates one example of a cellular communications system in which embodiments of the present disclosure may be implemented.

In this regard, FIG. 9 illustrates one example of a cellular communications system 900 in which embodiments of the present disclosure may be implemented. In the embodiments described herein, the cellular communications system 900 is, e.g., a 5G System (5GS) including a NR RAN or an Evolved Packet System (EPS) including a LTE RAN. In this example, the RAN includes base stations 902-1 and 902-2, which in LTE are referred to as eNBs and in 5G NR are referred to as gNBs or Next Generation RAN (NG-RAN) nodes, controlling corresponding (macro) cells 904-1 and 904-2. The base stations 902-1 and 902-2 are generally referred to herein collectively as base stations 902 and individually as base station 902. Likewise, the (macro) cells 904-1 and 904-2 are generally referred to herein collectively as (macro) cells 904 and individually as (macro) cell 904. The RAN may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The cellular communications system 900 also includes a core network 910. The base stations 902 (and optionally the low power nodes 906) are connected to the core network 910.

The base stations 902 and the low power nodes 906 provide service to wireless devices 912-1 through 912-5 in the corresponding cells 904 and 908. The wireless devices 912-1 through 912-5 are generally referred to herein collectively as wireless devices 912 and individually as wireless device 912. The wireless devices 912 are also sometimes referred to herein as UEs.

In the embodiments described herein, at least some of the UEs 912 have SLs with other UEs 912. For example, FIG. 9 illustrates a SL between UE 912-1 and UE 912-3 and another SL between UE 912-4 and UE 912-5. Also, at least some of the UEs 912 are within coverage of the RAN and have cellular links, which are also referred to herein as radio links, such as, e.g., Uu links.

Now, a description of some example embodiments of the present disclosure will be provided. Note that the following embodiments are described for NR, but they may be applied to LTE or any other Radio Access Technology (RAT). Also, the methods and solutions proposed work regardless of the core network used (Evolved Packet Core (EPC) or 5G CN (5GCN)) and the Multi-Radio Dual Connectivity (DC) (MR-DC) architecture options considered (Evolved Universal Terrestrial Radio Access Network (E-UTRAN) NR DC (EN-DC), NR Evolved Universal Terrestrial Radio Access (E-UTRA) DC (NE-DC), NG-RAN E-UTRA NR DC (NGEN-DC), or NR-DC).

When MR-DC operations are configured, the SL transmissions between two (or more) UEs may be totally controlled by the network (i.e., SL mode 1 transmission) or may operate autonomously without the help of the network (i.e., SL mode 2 transmission). Note that the latter case does not imply necessarily that all the SL UEs involved in the transmissions are out-of-coverage (one or more UEs may be still be in a network coverage by operating in SL mode 1).

The scenario targeted herein is when the UE (i.e., hereafter referred as UE1) performs normal Uu operations with the network and, at the same time, has ongoing SL operations with another UE (i.e., hereafter referred as UE2). For example, with reference to FIG. 9 UE1 and UE2 can be either of UE 912-1 or UE 912-3 connected by SL, or UE1 and UE 2 can be either of UE 912-4 or UE 912-5 connected by SL. Further, UE2 is in coverage of some cell even if not necessarily involved in any Uu operations with the cell(s) in which it is in coverage. The terms "UE1" and "UE2" can be used interchangeably throughout this document.

In one embodiment, the triggers for RLF are the same as defined in 3GPP Technical Specification (TS) 38.331 V15.6.0 section 5.3.10.3, "Detection of radio link failure." These include an RLF detected upon a maximum number of RLC retransmissions being reached. Alternatively, an RLF is detected if the measured Reference Signal Received Power (RSRP) is too low (given a related threshold) or upon a failure to decode Physical Downlink Control Channel (PDCCH)/Physical Downlink Shared Channel (PDSCH) due to low power signal quality (e.g., low RSRP, Reference Signal Received Quality (RSRQ)). Further, an RLF is detected upon receiving N out of coverage indications from the lower layers in a manner similar to RLF/Radio Link Management (RLM) procedure in LTE or upon receiving indication from the Medium Access Control (MAC) that random access has failed.

In another embodiment, upon detecting an RLF over the Uu radio link, UE1 sends a failure message to UE2 via an SL channel (i.e., if no Uu radio link to the network is available), where the failure message is about the detected RLF over the Uu link. In one embodiment, the failure message is the FailureInformation message (e.g., in case of Carrier Aggregation (CA) duplication). Yet, in another embodiment, the failure message is the MCGFailureInformation or the SCGFailureInformation message (e.g., in case of DC duplication). In an alternative embodiment, the failure message is a new RRC message used for handling RLF in CA, DC, or standalone operations with the help of SL.

In one embodiment, the FailureInformation, MCGFailureInformation, or SCGFailureInformation message that is sent by UE1 to UE2 is enhanced by including the UE1 context and (e.g., all) UE1 relevant information (e.g., the measurement that UE1 has performed, the failure type, UE identity, and/or serving frequencies). In another embodiment, the FailureInformation, MCGFailureInformation, or SCGFailureInformation message that is sent by UE1 to UE2 is enhanced by including a failure case that helps the network to understand what condition has caused the failure. Yet, in another embodiment, the FailureInformation, MCGFailureInformation, or SCGFailureInformation message that is sent by UE1 to UE2 is enhanced by including some or all of the latest available UE1 measurements.

In one embodiment, upon receiving the failure message from UE1, UE2 forwards the message to the network via an available Uu link between UE2 and the network (e.g., an associated base station 902 or low power node 906). In another embodiment, before sending the failure message to the network, UE2 performs a random access procedure to a selected cell if no Uu radio link is available and active (i.e., UE2 operating in SL mode 2). In particular, if UE2 has been allocated with contention-free random access resource, UE2 performs the contention-free random access procedure. If UE2 has not been allocated with a contention-free resource, UE2 performs a contention-based random access procedure.

In one embodiment, in case of MR-DC, UE2 forwards the failure message to the MCG via SRB1. Further, in case of MR-DC, in another embodiment, UE2 forwards the failure message to the SCG via SRB3. Alternatively, in case of MR-DC, in one embodiment, UE2 forwards the failure message to the SCG embedded in an MCG RRC message via SRB1. In another embodiment, in case of MR-DC, UE2 forwards the failure message to the network via a split Signaling Radio Bearer (SRB).

In one embodiment, if CA duplication is enabled between UE2 and the network, UE2 forwards the failure message to the network via the PCell. In another embodiment, if CA duplication is enabled between UE2 and the network, UE2 forwards the failure message to the network via the Primary Secondary Cell (PSCell). Yet, in another embodiment, if CA duplication is enabled between UE2 and the network, UE2 forwards the failure message to the network via one (or more) Secondary Cell(s) (SCell(s)).

In another embodiment, upon receiving the failure message from UE2, the network generates the RRC message according to the RRC procedure decided and sends the generated RRC message to the UE2. In one embodiment, upon receiving the failure message from UE2, the network generates the RRC message according to the RRC procedure decided and sends the generated RRC message to UE1 if is reachable. Here, the RRC signaling messages could be simply an RRC reconfiguration message.

In another embodiment, if MR-DC is enabled, upon receiving the failure message, the Master Node (MN) sends the RRC message via inter-node RRC messages to the Secondary Node (SN) that forwards such a message to UE1 (or UE2) via the SRB3. In one embodiment, if MR-DC is enabled, upon receiving the failure message, the SN sends the RRC message to UE1 (or UE2) via SRB3. Yet, in another embodiment, if MR-DC is enabled, upon receiving the failure message, the SN sends the RRC message via inter-node RRC messages to the MN that forwards such a message to UE1 (or UE2) via SRB1. In one embodiment, if MR-DC is enabled, upon receiving the failure message, the MN sends the RRC message to UE1 (or UE2) via the SRB1.

Yet, in another embodiment, if MR-DC is enabled, upon receiving the failure message, the MN sends an indication to the SN by requesting a certain RRC procedure to be performed (e.g., handover, reconfiguration, or re-establishment). In another embodiment, if MR-DC is enabled, upon receiving the failure message, the MN forwards such message to the SN (i.e., via inter-node RRC message), and the SN decides itself what actions to perform.

In one embodiment, upon receiving the RRC message from the network, UE2 forwards the message to UE1 via SL. Further, in another embodiment, upon receiving the RRC message from UE2, UE1 performs the procedure triggered by the RRC message. Alternatively, in one embodiment upon receiving the RRC message from the network, the UE1 performs the procedure triggered by the RRC message.

Figure 10A:
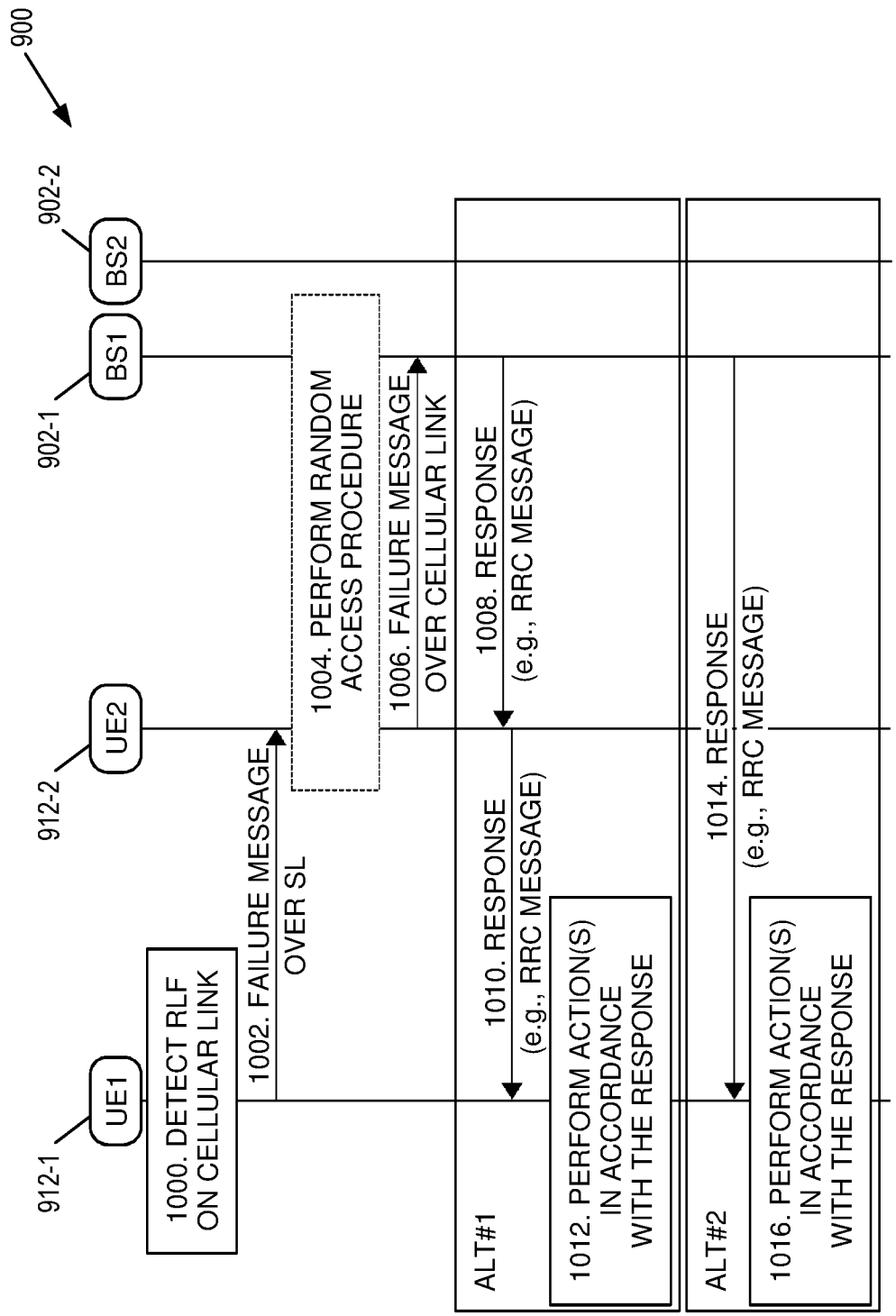
FIGS. 10A and 10B illustrate the operation of the cellular communications system of FIG. 9 in accordance with at least some aspects of at least some of the embodiments described herein.
Figure 10B:
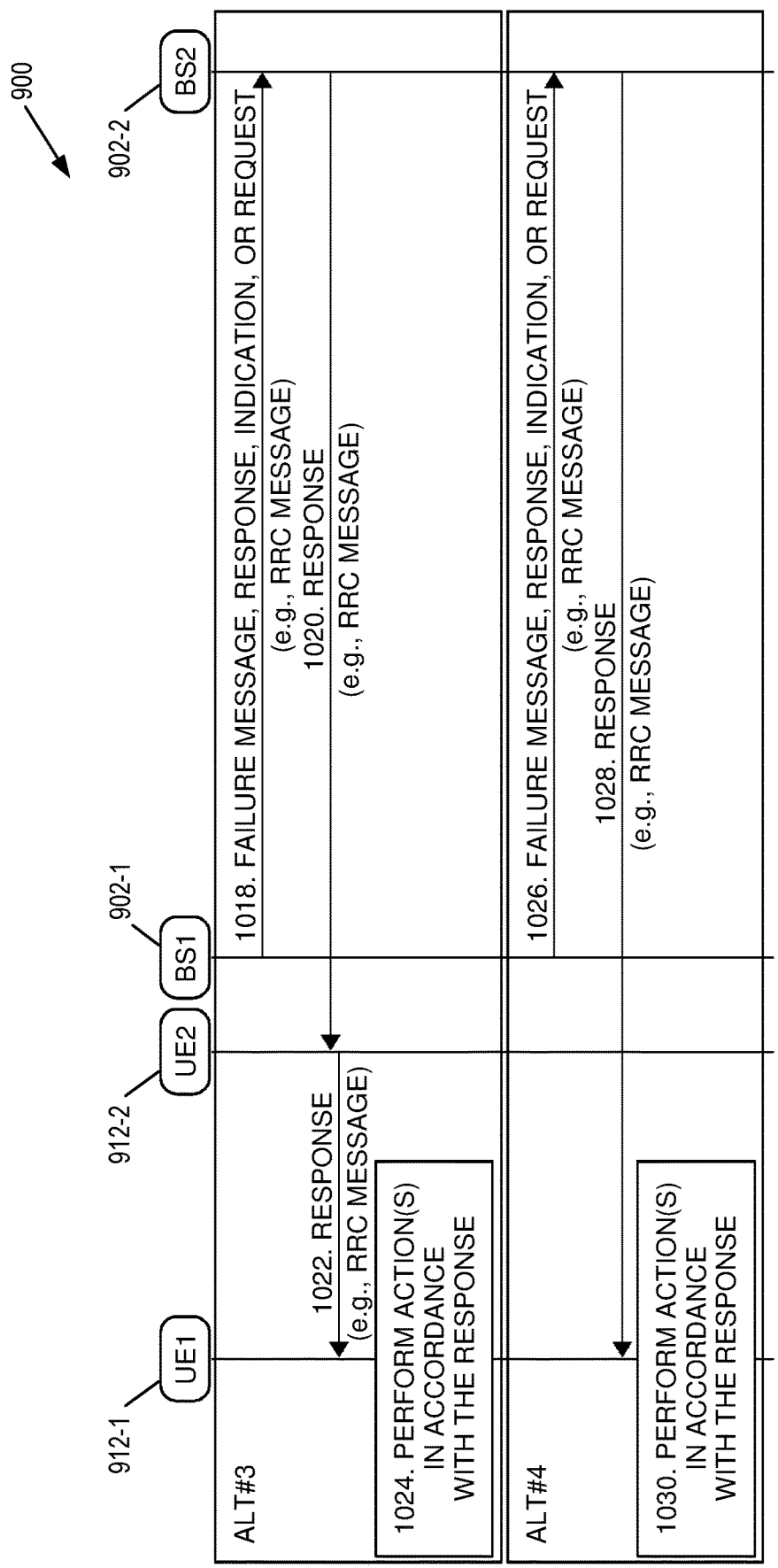

FIGS. 10A and 10B illustrate the operation of the cellular communications system 900 of FIG. 9 in accordance with at least some aspects of at least some of the embodiments described above. Note that optional steps are represented with dashed lines or boxes. In this example, a SL exists between two UEs 912, which are denoted here as UE1 912-1 and UE2 912-2. UE1 912-1 detects an RLF for a cellular link (e.g., a Uu link) between UE1 912-1 and the RAN of the cellular communications system 900 (step 1000). As described above, in one embodiment, UE1 912-1 detects the RLF based on any one of a number of predefined triggers for RLF. In one embodiment, the predefined triggers for RLF are the same as defined in 3GPP TS 38.331 V15.6.0 section 5.3.10.3, "Detection of radio link failure." These include an RLF detected upon a maximum number of Radio Link Control (RLC) retransmissions being reached. Alternatively, an RLF is detected if the measured RSRP is too low (given a related threshold) or upon a failure to decode PDCCH/PDCCH due to low power signal quality (e.g., low RSRP, RSRQ). Further, an RLF is detected upon receiving N out of coverage indications from the lower layers in a manner similar to RLF/RLM procedure in LTE or upon receiving indication from the MAC that random access has failed.

Upon detecting the RLF, UE1 912-1 sends a failure message to UE2 912-2 over the SL between UE1 912-1 and UE2 912-2 (step 1002). As discussed above, in one embodiment, upon detecting an RLF over the cellular radio link (e.g., no Uu radio link), UE1 912-1 sends the failure message to UE2 912-2 via an SL channel (e.g., if no Uu radio link to the network is available). The failure message is about the detected RLF over the cellular link (e.g., the Uu radio link). As discussed above, in one embodiment, the failure message is the FailureInformation message (e.g., in case of CA duplication). Yet, in another embodiment, the failure message is the MCGFailureInformation or the SCGFailureInformation message (e.g., in case of DC duplication). In an alternative embodiment, the failure message is a new RRC message used for handling RLF in CA, DC, or standalone operations with the help of SL.

In one embodiment, the failure message is the FailureInformation, MCGFailureInformation, or SCGFailureInformation message, and the FailureInformation, MCGFailureInformation, or SCGFailureInformation message that is sent by UE1 912-1 to UE2 912-2 is enhanced by including the UE1 context and (e.g., all) UE1 relevant information. In another embodiment, the FailureInformation, MCGFailureInformation, or SCGFailureInformation message that is sent by UE1 912-1 to UE2 912-2 is enhanced by including a failure case that helps the network to understand what condition has caused the failure. Yet, in another embodiment, the FailureInformation, MCGFailureInformation, or SCGFailureInformation message that is sent by UE1 912-1 to UE2 912-2 is enhanced by including some or all of the latest available UE1 measurements.

Upon receiving the failure message from UE1 912-1, UE2 912-2 optionally performs a random access procedure to establish a cellular radio link (e.g., a Uu radio link) to the network (step 1004). Note that step 1004 may not be performed if UE2 912-2 already has an existing cellular radio link (e.g., a Uu radio link). More specifically, before sending the failure message to the network, UE2 912-2 performs a random access procedure to a selected cell if no Uu radio link is available and active (i.e., UE2 912-2 operating in SL mode 2). In particular, if UE2 912-2 has been allocated with a contention-free random access resource, UE2 912-2 performs the contention-free random access procedure. If UE2 912-2 has not been allocated with a contention-free random access resource, U2E performs a contention-based random access procedure. In this example, UE2 912-2 either already has a cellular radio link to a base station 902, denoted here as BS1 902-1, or establishes a cellular radio link to BS1 902-1 via the random access procedure.

UE2 912-2 sends the failure message to the network via the cellular radio link (e.g., via a Uu radio link) (step 1006). As discussed above, in one embodiment, in case of MR-DC, UE2 912-2 forwards the failure message to the MCG via SRB1 (i.e., forwards the failure message to a base station 902 that serves the MCG, which in this example is BS1 902-1, via SRB1). Further, in case of MR-DC, in another embodiment, UE2 912-2 forwards the failure message to the SCG via SRB3 (i.e., forwards the failure message to a base station 902 that serves the SCG, which in this example is BS1 902-1, via SRB3). Alternatively, in case of MR-DC, in one embodiment, UE2 912-2 forwards the failure message to the SCG embedded in an MCG RRC message via SRB1 (i.e., forwards the failure message to a base station 902 that serves the SCG, which in this example is BS1 902-1, embedded in an MCG RRC message via SRB1). In another embodiment, in case of MR-DC, UE2 912-2 forwards the failure message to the network (e.g., to BS1 902-1) via split SRB.

In one embodiment, if CA duplication is enabled between UE2 912-2 and the network, UE2 912-2 forwards the failure message to the network via the PCell, which in this example is served by BS1 902-1. In another embodiment, if CA duplication is enabled between UE2 912-2 and the network, UE2 912-2 forwards the failure message to the network via the PSCell, which in this example is served by BS1 902-1. Yet, in another embodiment, if CA duplication is enabled between UE2 912-2 and the network, UE2 912-2 forwards the failure message to the network via one (or more) SCell(s), which in this example is served by BS1 902-1.

Once the failure message is sent from UE2 912-2 to BS1 902-1, a number of alternative solutions are proposed. In a first alternative solution (ALT #1), upon receiving the failure message from UE2 912-2, BS1 902-1 generates a response and sends the response to UE2 912-2 (step 1008). As discussed above, in some embodiments, the response is an RRC message for an RRC procedure that BS1 902-1 has decided is to be performed in response to the failure message. UE2 912-2 forwards the response to UE1 912-1 (step 1010). Upon receiving the response, UE1 912-1 performs one or more actions in accordance with the response (step 1012). For example, if the response is an RRC message for a particular RRC procedure, UE1 912-1 then continues the particular RRC procedure. Here, the RRC signaling message may be, for example, an RRC reconfiguration message such that the RRC procedure is an RRC reconfiguration procedure.

In the second alternative solution (ALT #2), upon receiving the failure message from UE2 912-2, BS1 902-1 generates a response and sends the response to UE1 912-1, if UE1 912-1 is reachable (step 1014). As discussed above, the response is an RRC message according to an RRC procedure that BS1 902-1 has decided is to be performed in response to the failure message. Upon receiving the response, UE1 912-1 performs one or more actions in accordance with the response (step 1016). For example, if the response is an RRC message for a particular RRC procedure, UE1 912-1 then continues the particular RRC procedure. Here, the RRC signaling message may be, for example, an RRC reconfiguration message such that the RRC procedure is an RRC reconfiguration procedure.

In the third alternative solution (ALT #3), upon receiving the failure message from UE2 912-2, BS1 902-1 sends the failure message, a generated response to the failure message, or an indication or request for a particular RRC procedure to another base station 902, denoted here as BS2 902-2 (step 1018). BS2 902-2 then generates a response and sends the response to UE2 912-2 directly (step 1020) or via BS1 902-1. UE2 912-2 forwards the response to UE1 912-1 (step 1022). Upon receiving the response, UE1 912-1 performs one or more actions in accordance with the response (step 1024). For example, if the response is an RRC message for a particular RRC procedure, UE1 912-1 then continues the particular RRC procedure.

In the fourth alternative solution (ALT #4), upon receiving the failure message from UE2 912-2, BS1 902-1 sends the failure message, a generated response to the failure message, or an indication or request for a particular RRC procedure to another base station 902, denoted here as BS2 902-2 (step 1026). BS2 902-2 then generates a response and sends the response to UE1 912-1 directly (step 1028) or via BS1 902-1. Upon receiving the response, UE1 912-1 performs one or more actions in accordance with the response (step 1030). For example, if the response is an RRC message for a particular RRC procedure, UE1 912-1 then continues the particular RRC procedure.

As discussed above, in one embodiment, if MR-DC is enabled, upon receiving the failure message at the MN (which is BS1 902-1 in this example), the MN sends the RRC message via inter-node RRC messages to the SN (which is BS2 902-2 in this example) that forwards such a message to UE1 912-1 (ALT #4) or UE2 912-2 (ALT #3) via SRB3. In another embodiment, if MR-DC is enabled, upon receiving the failure message at the SN (BS1 902-1 in this example), the SN sends an RRC message triggering the desired RRC procedure to UE1 912-1 (ALT #2) or UE2 912-2 (ALT #1) via SRB3. Yet, in another embodiment, if MR-DC is enabled, upon receiving the failure message at the SN (which is BS1 902-1 in this example), the SN sends an RRC message that triggers the desired RRC procedure via inter-node RRC messages to the MN (which is BS2 902-2 in this example), and the MN forwards the RRC message to UE1 912-1 (ALT #4) or UE2 912-2 (ALT #3) via SRB1. In one embodiment, if MR-DC is enabled, upon receiving the failure message at the MN (BS1 902-1 in this example), the MN sends an RRC message for the desired RRC procedure to UE1 912-1 (ALT #2) or UE2 912-2 (ALT #1) via the SRB1.

Yet, in another embodiment, if MR-DC is enabled, upon receiving the failure message at the MN (BS1 902-1 in this example), the MN sends an indication to the SN (BS2 902-2 in this example) by requesting a certain RRC procedure to be performed (e.g., handover, reconfiguration, or re-establishment). In another embodiment, if MR-DC is enabled, upon receiving the failure message at the MN (BS1 902-1 in this example), the MN forwards such message to the SN (BS2 902-2 in this example), e.g., via inter-node RRC message, and the SN decides itself what actions to perform.

In one embodiment, upon receiving the RRC message from the network, UE2 912-2 forwards the message to UE1 912-1 via the SL between UE1 912-1 and UE2 912-2. Further, in another embodiment upon receiving the RRC message from UE2 912-2, UE1 912-1 performs the procedure triggered by the RRC message. Alternatively, in one embodiment upon receiving the RRC message from the network, the UE1 912-1 performs the procedure triggered by the RRC message.

Figure 11:
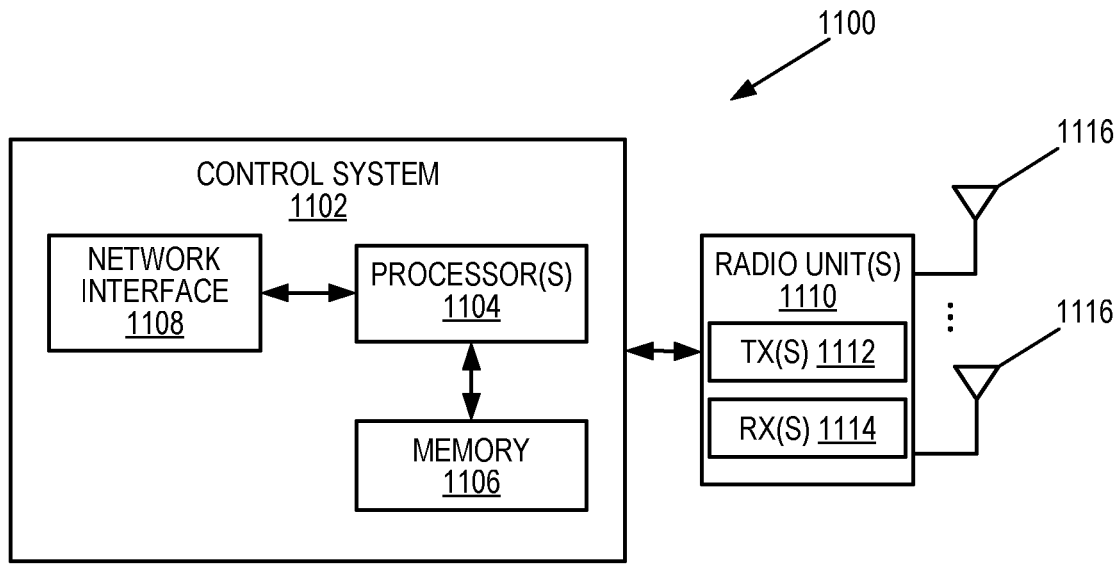
FIG. 11 is a schematic block diagram of a radio access node according to some embodiments of the present disclosure.

FIG. 11 is a schematic block diagram of a radio access node 1100 according to some embodiments of the present disclosure. The radio access node 1100 may be, for example, a base station 902 or 906. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein (e.g., one or more functions of a BS1 902-1 or BS2 902-2 described above with respect to FIGS. 10A and 10B). In some embodiments, the function(s) are implemented in software that is stored, e.g., in the memory 1106 and executed by the one or more processors 1104.

Figure 12:
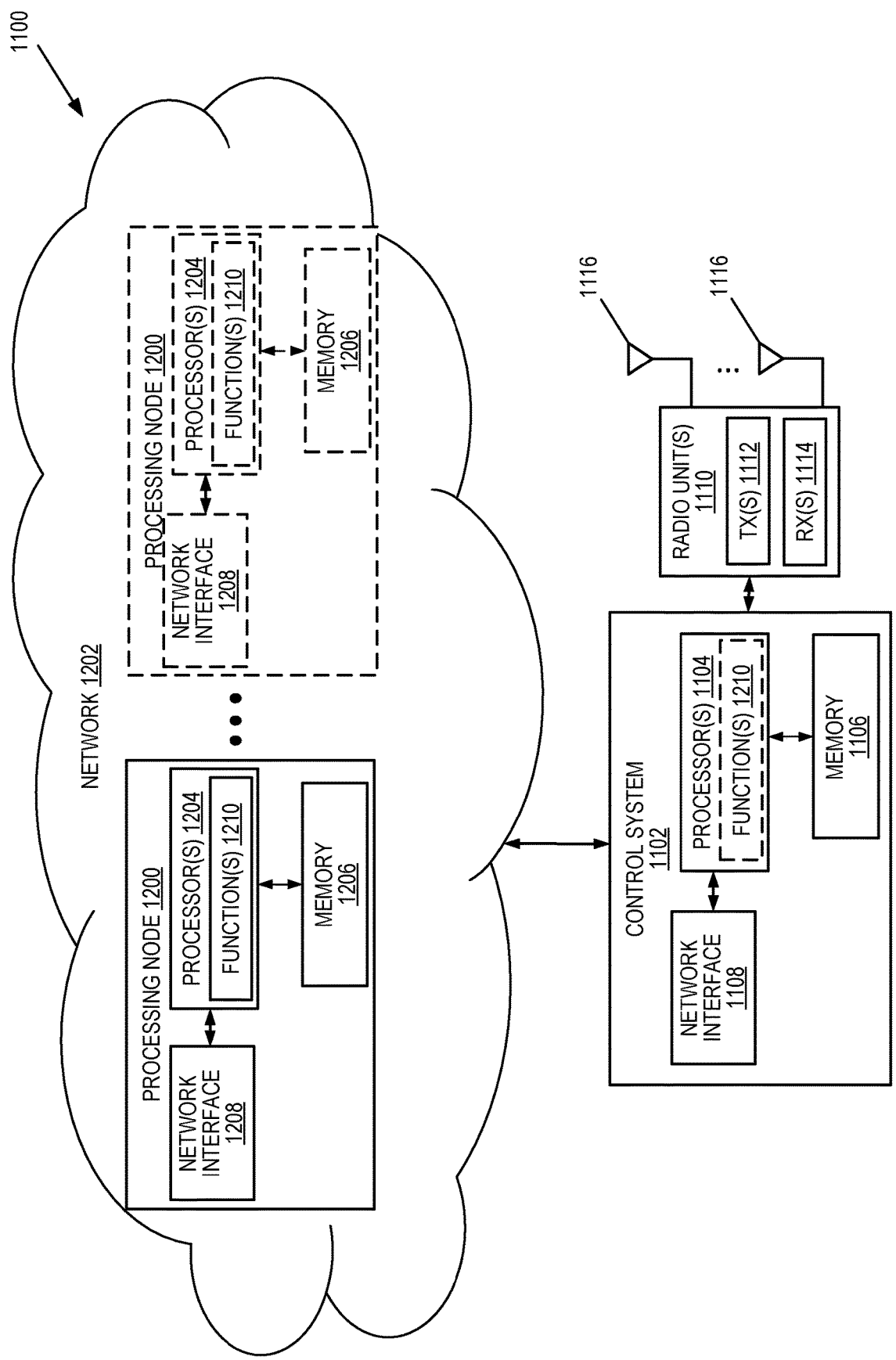
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node (s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein (e.g., one or more functions of a BS1 902-1 or BS2 902-2 described above with respect to FIGS. 10A and 10B) are implemented at the one or more processing nodes 1200 or distributed across the control system 1102 and the one or more processing nodes 1200 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
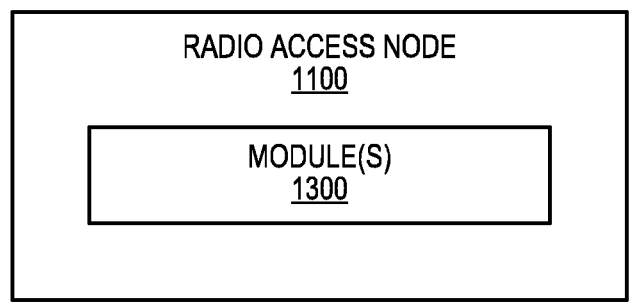
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein (e.g., one or more functions of a BS1 902-1 or BS2 902-2 described above with respect to FIGS. 10A and 10B). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
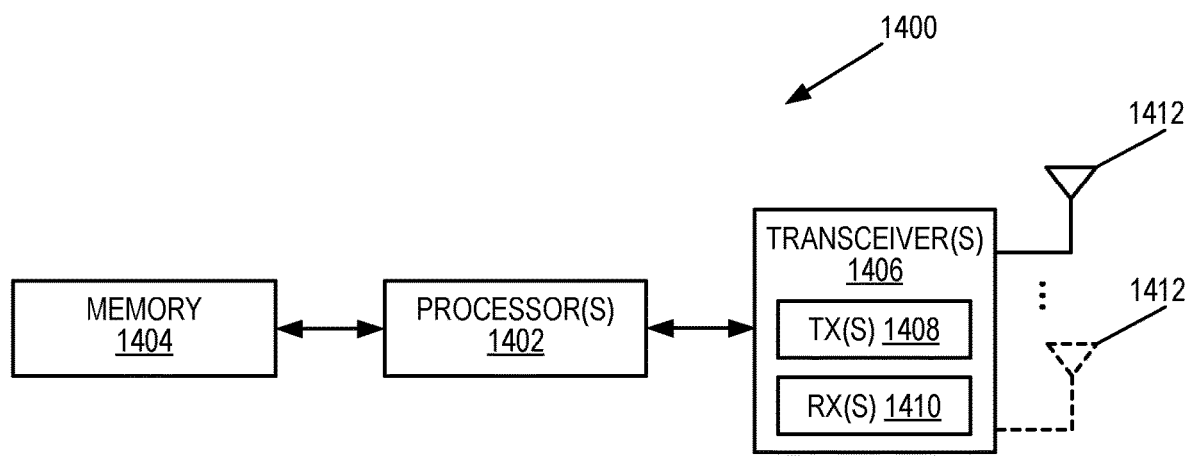
FIG. 14 is a schematic block diagram of a UE according to some embodiments of the present disclosure.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the UE 1400 described above (e.g., one or more functions of a UE1 912-1 or UE2 912-2 described above with respect to FIGS. 10A and 10B) may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein (e.g., one or more functions of a UE1 912-1 or UE2 912-2 described above with respect to FIGS. 10A and 10B) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
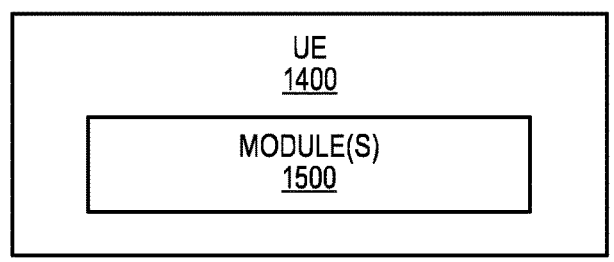
FIG. 15 is a schematic block diagram of the UE according to some other embodiments of the present disclosure.

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein (e.g., one or more functions of a UE1 912-1 or UE2 912-2 described above with respect to FIGS. 10A and 10B).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

In the following, some further exemplary embodiments are listed:

Embodiment 1: A method performed by a first wireless device for detecting and handling a radio link failure in a cellular communications system, the method comprising: detecting (1000) a radio link failure of a radio link between the first wireless device and a radio access network of the cellular communications system; and sending (1002) a failure message to a second wireless device via a sidelink between the first wireless device and the second wireless device.

Embodiment 2: The method of embodiment 1 further comprising receiving (1010, 1022) a response from the second wireless device via the sidelink.

Embodiment 3: The method of embodiment 1 further comprising receiving (1014, 1028) a response from a radio access node in the radio access network via a radio link between the first wireless device and the radio access node.

Embodiment 4: The method of embodiment 2 or 3 wherein the response is a RRC message that triggers a particular RRC procedure.

Embodiment 5: The method of any one of embodiments 2 to 4 further comprising performing (1012, 1016, 1024, 1030) one or more actions in accordance with the response.

Embodiment 6: The method of any one of embodiments 1 to 5 wherein the failure message is a FailureInformation message.

Embodiment 7: The method of any one of embodiments 1 to 5 wherein the failure message is a MCGFailureInformation message or a SCGFailureInformation message.

Embodiment 8: The method of embodiment 6 or 7 wherein the failure message comprises a wireless device context of the first wireless device.

Embodiment 9: The method of embodiment 6, 7, or 8 wherein the failure message comprises information that is relevant to the radio link failure.

Embodiment 10: The method of any one of embodiments 1 to 5 wherein the failure message is a RRC message for handling radio link failure in CA DC or standalone operation with help of a sidelink.

Embodiment 11: The method of any one of embodiments 1 to 10 wherein the failure message comprises an indication of a failure case that directly or indirectly indicates one or more conditions that caused the radio link failure.

Embodiment 12: The method of any one of embodiments 1 to 10 wherein the failure message comprises one or more latest measurements (e.g., one or more latest measurements related to the radio link) made by the first wireless device.

Embodiment 13: A method performed by a second wireless device for handling a radio link failure at a first wireless device in a cellular communications system, the method comprising: receiving (1002) a failure message from the first wireless device via a sidelink between the first wireless device and the second wireless device, the failure message being related to a radio link failure at the first wireless device of a radio link between the first wireless device and a radio access network of the cellular communications system; and sending (1006) the failure message to a radio access node in the radio access network of the cellular communications system via a radio link between the second wireless device and the radio access node.

Embodiment 14: The method of embodiment 13 further comprising performing (1004) a radio access procedure to establish the radio link between the second wireless device and the radio access node.

Embodiment 15: The method of embodiment 13 or 14 further comprising: receiving (1008) a response from the radio access node; and sending (1010) the response to the first wireless device via the sidelink.

Embodiment 16: The method of embodiment 13 or 14 further comprising: receiving (1008) a response from a second radio access node; and sending (1010) the response to the first wireless device via the sidelink.

Embodiment 17: The method of embodiment 15 or 16 wherein the response is an RRC message that triggers a particular RRC procedure.

Embodiment 18: The method of any one of embodiments 13 to 17 wherein the failure message is a FailureInformation message.

Embodiment 19: The method of any one of embodiments 13 to 17 wherein the failure message is a MCGFailureInformation message or a SCGFailureInformation message.

Embodiment 20: The method of embodiment 18 or 19 wherein the failure message comprises a wireless device context of the first wireless device.

Embodiment 21: The method of embodiment 18, 19, or 20 wherein the failure message comprises information that is relevant to the radio link failure.

Embodiment 22: The method of any one of embodiments 13 to 17 wherein the failure message is a RRC message for handling radio link failure in CA DC or standalone operation with help of a sidelink.

Embodiment 23: The method of any one of embodiments 13 to 22 wherein the failure message comprises an indication of a failure case that directly or indirectly indicates one or more conditions that caused the radio link failure.

Embodiment 24: The method of any one of embodiments 13 to 23 wherein the failure message comprises one or more latest measurements (e.g., one or more latest measurements related to the radio link) made by the first wireless device.

Embodiment 25: A method performed by a base station handing radio link failure, the method comprising: receiving (1006) a failure message from a second wireless device, the failure message being related to a radio link failure at a first wireless device of a radio link between the first wireless device and a radio access network of a cellular communications system; and either: sending (1008) a response to the second wireless device; or sending (1014) a response to the first wireless device; or sending (1018, 1026), to a second base station, the failure message, a response to the failure message, an indication that triggers a particular procedure (e.g., a particular RRC procedure), or a request for a particular procedure (e.g., a particular RRC procedure).

Embodiment 26: The method of embodiment 25 wherein the response is an RRC message that triggers a particular RRC procedure.

Embodiment 27: The method of any one of embodiments 25 or 26 wherein the failure message is a FailureInformation message.

Embodiment 28: The method of any one of embodiments 25 or 26 wherein the failure message is a MCGFailureInformation message or a SCGFailureInformation message.

Embodiment 29: The method of embodiment 27 or 28 wherein the failure message comprises a wireless device context of the first wireless device.

Embodiment 30: The method of embodiment 27, 28, or 29 wherein the failure message comprises information that is relevant to the radio link failure.

Embodiment 31: The method of any one of embodiments 25 or 26 wherein the failure message is a RRC message for handling radio link failure in CA DC or standalone operation with help of a sidelink.

Embodiment 32: The method of any one of embodiments 25 to 31 wherein the failure message comprises an indication of a failure case that directly or indirectly indicates one or more conditions that caused the radio link failure.

Embodiment 33: The method of any one of embodiments 25 to 32 wherein the failure message comprises one or more latest measurements (e.g., one or more latest measurements related to the radio link) made by the first wireless device.

Embodiment 34: A wireless device comprising: processing circuitry configured to perform any of the steps of any of the Group A embodiments; and power supply circuitry configured to supply power to the wireless device.

Embodiment 35: A base station comprising: processing circuitry configured to perform any of the steps of any of the Group B embodiments; and power supply circuitry configured to supply power to the base station.

Embodiment 36: A UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure:
- 3GPP Third Generation Partnership Project
- 5G Fifth Generation
- 5GCN Fifth Generation Core Network
- 5GS Fifth Generation System
- ACK Acknowledgement
- AM Acknowledged Mode
- AMF Access and Mobility Function
- ASIC Application Specific Integrated Circuit
- AUSF Authentication Server Function
- BSR Buffer Status Report
- CA Carrier Aggregation
- CBR Channel Busy Ratio C-ITS Cellular Intelligent Transport Systems
CN Core Network
CP Control Plane
CPU Central Processing Unit
D2D Device-to-Device
DC Dual Connectivity
DCI Downlink Control Information
DSP Digital Signal Processor
eNB Enhanced or Evolved Node B
EN-DC Evolved Universal Terrestrial Radio Access Network New Radio Dual Connectivity
eLTE Enhanced Long Term Evolution
EPC Evolved Packet Core
EPS Evolved Packet System
E-UTRA Evolved Universal Terrestrial Radio Access
E-UTRAN Evolved Universal Terrestrial Radio Access Network
eV2X Enhanced Vehicle-to-Everything
FPGA Field Programmable Gate Array
gNB New Radio Base Station
HARQ Hybrid Automatic Repeat Request
HSS Home Subscriber Server
ID Identity
ITS Intelligent Transport Systems
LTE Long Term Evolution
MAC Medium Access Control
MC Multi-Connectivity
MCG Master Cell Group
MeNB Master Enhanced or Evolved Node B
MgNB Master New Radio Base Station
MME Mobility Management Entity
MN Master Node
MR-DC Multi-Radio Dual Connectivity
MTC Machine Type Communication
NACK Negative Acknowledgement
NAS Non Access Stratum
NE-DC New Radio Evolved Universal Terrestrial Radio Access Dual Connectivity
NEF Network Exposure Function
NF Network Function
NG-eNB Next Generation Enhanced or Evolved Node B
NGEN-DC Next Generation Radio Access Network Evolved Universal Terrestrial Radio Access New Radio Dual Connectivity
NG-RAN Next Generation Radio Access Network
NR New Radio
NRF Network Function Repository Function
NSA Non-Stand-Alone
NSSF Network Slice Selection Function
OEM Original Equipment Manufacturer
PCell Primary Cell
PCF Policy Control Function
PDCCH Physical Downlink Control Channel
PDSCH Physical Downlink Shared Channel
PDU Protocol Data Unit
P-GW Packet Data Network Gateway
PSCCH Physical Sidelink Control Channel
PSCell Primary Secondary Cell
PSSCH Physical Sidelink Shared Channel
QoS Quality of Service
RA Resource Allocation
RAM Random Access Memory
RAN Radio Access Network
RAT Radio Access Technology
Rel Release
RLC Radio Link Control
RLF Radio Link Failure
RLM Radio Link Management
ROM Read Only Memory
RRC Radio Resource Control
RRH Remote Radio Head
RSRP Reference Signal Received Power
RSRQ Reference Signal Received Quality
RSU Road Side Unit
RX Receiving
SA Stand-Alone
SCEF Service Capability Exposure Function
SCG Secondary Cell Group
SCell Secondary Cell
SCI Sidelink Control Information
SeNB Secondary Enhanced or Evolved Node B
SgNB Secondary New Radio Base Station
SIB System Information Block
SL Sidelink
SMF Session Management Function
SN Secondary Node
SRB Signaling Radio Bearer
TB Transport Block
TR Technical Report
TS Technical Specification
TX Transmitting
UDM Unified Data Management
UE User Equipment
UM Unacknowledged Mode
UP User Plane
UPF User Plane Function
URLLC Ultra Reliable Low Latency Communications
V2I Vehicle-to-Infrastructure
V2P Vehicle-to-Pedestrian
V2V Vehicle-to-Vehicle
V2X Vehicle-to-Everything

The invention claimed is:

1. A method performed by a first wireless device for detecting and handling a radio link failure in a cellular communications system wherein the first wireless device is connected to a second wireless device via a sidelink, the method comprising:
  detecting a radio link failure of a first radio link between the first wireless device and a radio access network node of the cellular communications system;
  sending a failure message to the second wireless device via the sidelink between the first wireless device and the second wireless device to be forwarded to the radio access network node while not initiating a re-establishment procedure with the radio access network node; and
  receiving a response message originating from the radio access network node, requesting a Radio Resource Control (RRC) reconfiguration, wherein the response message is received from the second wireless device via the sidelink.

2. The method of claim 1 wherein the response message is an RRC message that triggers the RRC reconfiguration.

3. The method of claim 1 wherein the failure message is a FailureInformation message.

4. The method of claim 1 wherein the failure message is a MCGFailureInformation message or a SCGFailureInformation message.

5. The method of claim 3 wherein the failure message comprises a wireless device context of the first wireless device.

6. The method of claim 3 wherein the failure message comprises information that is relevant to the radio link failure.

7. The method of claim 1 wherein the failure message is an RRC message for handling radio link failure in Carrier Aggregation (CA) Dual Connectivity (DC) or standalone operation with help of the sidelink.

8. The method of claim 1 wherein the failure message comprises an indication of a failure case that directly or indirectly indicates one or more conditions that caused the radio link failure.

9. The method of claim 1 wherein the failure message comprises one or more latest measurements related to the first radio link made by the first wireless device.

10. A method performed by a second wireless device for handling a radio link failure at a first wireless device in a cellular communications system wherein the first device is connected to the second wireless device via a sidelink, the method comprising:
    receiving a failure message from the first wireless device via the sidelink between the first wireless device and the second wireless device, the failure message being related to a radio link failure at the first wireless device of a first radio link between the first wireless device and a radio access network node of the cellular communications system, wherein the failure message does not include an initiation of a re-establishment procedure by the first wireless device with the radio access network node; and
    forwarding the failure message to the radio access network node in the radio access network of the cellular communications system via a second radio link between the second wireless device and the radio access network node;
    receiving a response from the radio access network node requesting; and
    sending the response to the first wireless device via the sidelink.

11. The method of claim 10 further comprising performing a radio access procedure to establish the second radio link between the second wireless device and the radio access network node.

12. The method of claim 11 wherein the radio access procedure is a random access procedure.

13. The method of claim 10 wherein the response is a Radio Resource Control (RRC) message that triggers a particular RRC procedure.

14. The method of claim 10 wherein the failure message is a FailureInformation message.

15. The method of claim 10 wherein the failure message is a MCGFailureInformation message or a SCGFailureInformation message.

16. The method of claim 14 wherein the failure message comprises a wireless device context of the first wireless device.

17. The method of claim 14 wherein the failure message comprises information that is relevant to the radio link failure.

18. A method performed by a first base station handling radio link failure, the method comprising:
    receiving a failure message from a second wireless device, the failure message being indicative of a radio link failure at a first wireless device of a first radio link between the first wireless device and a radio access network node of a cellular communications system, wherein the failure message does not include an initiation of a re-establishment procedure by the first wireless device with the radio access network node; and
    sending a response message requesting the first wireless device to perform a Radio Resource Control (RRC) reconfiguration, wherein the response message is sent to the first wireless device via the second wireless device.

19. A first wireless device for detecting and handling a radio link failure in a cellular communications system wherein the first wireless device is connected to a second wireless device via a sidelink, the first wireless device comprising:
    one or more transmitters;
    one or more receivers; and
    processing circuitry associated with the one or more transmitters and the one or more receivers, the processing circuitry configured to cause the first wireless device to:
        detect a radio link failure of a first radio link between the first wireless device and a radio access network node of the cellular communications system;
        send a failure message to the second wireless device via the sidelink between the first wireless device and the second wireless device to be forwarded to the radio access network node while not initiating a re-establishment procedure with the radio access network node; and
        receive from the radio access network node a response message originating from the radio access network node, requesting a Radio Resource Control (RRC) reconfiguration, wherein the response message is received from the second wireless device via the sidelink.

20. A second wireless device for handling a radio link failure at a first wireless device in a cellular communications system wherein the first device is connected to the second wireless device via a sidelink, the second wireless device comprising:
    one or more transmitters;
    one or more receivers; and
    processing circuitry associated with the one or more transmitters and the one or more receivers, the processing circuitry configured to cause the second wireless device to:
        receive a failure message from the first wireless device via the sidelink between the first wireless device and the second wireless device, the failure message being related to a radio link failure at the first wireless device of a first radio link between the first wireless device and a radio access network node of the cellular communications system, wherein the failure message does not include an initiation of a re-establishment procedure by the first wireless device with the radio access network node; and
        forward the failure message to the radio access network node in the radio access network of the cellular communications system via a second radio link between the second wireless device and the radio access network node;
        receiving a response from the radio access network node requesting; and
        sending the response to the first wireless device via the sidelink.

21. A first base station for handling radio link failure, the first base station comprising processing circuitry configured to cause the first base station to:
    receive a failure message from a second wireless device, the failure message being indicative of a radio link failure at a first wireless device of a first radio link between the first wireless device and a radio access network node of a cellular communications system, wherein the failure message does not include an initiation of a re-establishment procedure by the first wireless device with the radio access network node; and send a response message requesting the first wireless device to perform a Radio Resource Control (RRC) reconfiguration, wherein the response message is sent to the first wireless device via the second wireless device.

* * * * *